United States Patent
Giannakis et al.

(10) Patent No.: US 7,769,115 B2
(45) Date of Patent: Aug. 3, 2010

(54) NONCOHERENT ULTRA-WIDEBAND (UWB) DEMODULATION

(75) Inventors: Georgios B. Giannakis, Minnetonka, MN (US); Liuqing Yang, Gainesville, FL (US)

(73) Assignee: Regents of the University of Minnesota, Minneapolis, MN (US)

( * ) Notice: Subject to any disclaimer, the term of this patent is extended or adjusted under 35 U.S.C. 154(b) by 1309 days.

(21) Appl. No.: 11/242,623

(22) Filed: Oct. 3, 2005

(65) Prior Publication Data
US 2006/0083338 A1 Apr. 20, 2006

Related U.S. Application Data

(60) Provisional application No. 60/615,489, filed on Oct. 1, 2004.

(51) Int. Cl.
H04L 27/06 (2006.01)
(52) U.S. Cl. .................... 375/343; 375/316; 375/340; 375/341
(58) Field of Classification Search ............. 375/343, 375/316, 340, 341
See application file for complete search history.

(56) References Cited
U.S. PATENT DOCUMENTS 5,852,630 A * 12/1998 Langberg et al. ............ 375/219
7,006,583 B2 * 2/2006 Ho et al. .................. 375/316
2002/0130809 A1 * 9/2002 Kim ........................ 342/125

(Continued)

OTHER PUBLICATIONS

R. Hoctor et al., "An Overview of Delay-Hopped Transmitted-Reference RF Communications," G.E. Research and Development Center, Technical Information Series, pp. 1-29, Jan. 2002.

(Continued)

*Primary Examiner*—Shuwang Liu
*Assistant Examiner*—Kenneth Lam
(74) *Attorney, Agent, or Firm*—Shumaker & Sieffert, P.A.

(57) ABSTRACT

Techniques are described that provide noncoherent demodulation via correlating "dirty" templates in wireless communication systems. In particular, the described techniques cross-correlate dirty templates that are adjacent symbol-long segments of the received noisy waveform. Unlike transmitted reference (TR) and differential templates that are noisy, i.e., propagate through the wireless communication channel, these dirty templates are both noisy and offset in time and, thus, are dirty. As a result, the described techniques enable noncoherent demodulation without timing synchronization and channel estimation. Symbol demodulation may be performed utilizing a maximum likelihood (ML) sequence detector or, alternatively, conditional ML demodulation may be performed to reduce receiver complexity. The described techniques may also be applied to a TR scheme to improve performance in the presence of mistiming. In any case, the techniques may be applied to narrowband, wideband, or ultra-wideband (UWB) communication systems and remain operational without timing synchronization or channel estimation.

54 Claims, 12 Drawing Sheets

U.S. PATENT DOCUMENTS

| | | | | |
|---|---|---|---|---|
| 2002/0190786 | A1* | 12/2002 | Yoon et al. | 329/313 |
| 2003/0108133 | A1* | 6/2003 | Richards | 375/351 |
| 2003/0198308 | A1* | 10/2003 | Hoctor et al. | 375/354 |
| 2004/0202256 | A1* | 10/2004 | Giannakis et al. | 375/267 |
| 2004/0257167 | A1* | 12/2004 | Kim et al. | 332/112 |
| 2005/0018750 | A1* | 1/2005 | Foerster et al. | 375/130 |
| 2005/0094740 | A1* | 5/2005 | Borran et al. | 375/267 |
| 2005/0175125 | A1* | 8/2005 | Krivokapic | 375/340 |
| 2006/0203943 | A1* | 9/2006 | Scheim et al. | 375/341 |
| 2008/0020713 | A1* | 1/2008 | Krishnan | 455/70 |

OTHER PUBLICATIONS

L. Yang et al., "Blind UWB Timing With a Dirty Template," 2004 IEEE International Conference on Acoustics, Speech, and Signal Processing, pp. IV-509-IV512, Montreal, Quebec, Canada, May 17-21, 2004.

L. Yang et al., "Optimal Pilot Waveform Assisted Modulation for Ultra-Wideband Communications," IEEE Transactions On Wireless Communications, vol. 3, No. 4, pp. 1236-1249, Jul. 2004.

D. Porrat et al., "Bandwidth Scaling In Ultra Wideband Communication," Forty-First Annual Allerton Conference on Communication, Control and Computing, University of Illinois at U-C, Monticello, IL, pp. 1104-1113, Oct. 1-3, 2003.

H. Zhang et al., "Generalized Transmitted-Reference UWB Systems," 2003 IEEE Conference on Ultra Wideband Systems and Technologies, pp. 147-151, Reston, VA, Nov. 16-19, 2003.

J. Foerster, "Channel Modeling Sub-Committee Report Final," IEEE P802.15-02/368r5-SG3a, IEEE P802.15 Working Group for WPAN, pp. 1-40, Nov. 2002.

J.D. Choi et al., "Performance of Ultra-Wideband Communications With Suboptimal Receivers In Multipath Channels," IEEE Journal on Selected Areas in Communications, vol. 20, No. 9, pp. 1754-1766, Dec. 2002.

L. Yang et al., "Low-Complexity Training for Rapid Timing Acquisition in Ultra Wideband Communications," Procedure Of Global Telecommunications Conference, San Francisco, CA, pp. 769-773, Dec. 1-5, 2003.

L. Yang et al., "Noncoherent Ultra-Wideband Ratios," MILCOM 2004-2004 IEEE Military Communications Conference, Monterey, California, vol. 2, pp. 786-791, 2004.

L. Yang et al., "Non-Data Aided Timing Acquisition of Ultra-Wideband Transmissions Using Cyclostationarity," 2003 IEEE International Conference on Acoustics, Speech, and Signal Processing, vol. IV of VI, Hong Kong, China, pp. 121-124, Apr. 6-10, 2003.

M. Ho et al., "A Differential Detector for an Ultra-Wideband Communications System," Vehicular Technology Conference, Birmingham, AL, pp. 1896-1900, May 4-9, 2002.

R. Blazquez et al., "Coarse Acquisition for Ultra Wideband Digital Receivers," 2003 IEEE International Conference on Acoustics, Speech, and Signal Processing, Hong Kong, pp. IV-137-IV-140, Apr. 6-10, 2003.

R. Raheli et al., "Per-Survivor Processing: A General Approach to MLSE In Uncertain Environments," IEEE Transactions on Communications, vol. 43, No. 2/3/4, pp. 354-364, 1995.

R.A. Scholtz, "Multiple Access with Time-Hopping Impulse Modulation," Procedure Of MILCOM, Communciations on the Move, Conference Record vol. 2 of 3, Boston, MA pp. 447-450, Oct. 11-14, 1993.

Y. Chao et al., "Optimal and Suboptimal Receivers for Ultra-Wideband Transmitted Reference Systems," Globecom '03, IEEE Global Telecommunications Conference, San Fransisco, CA, pp. 759-763, Dec. 1-5, 2003.

Z. Tian et al., "Data-Aided ML Timing Acquisition in Ultra-Wideband Ratios," 2003 IEEE Conference on Ultra Wideband Systems and Technologies, pp. 142-146, Reston, VA, Nov. 2003.

* cited by examiner

NONCOHERENT ULTRA-WIDEBAND (UWB) DEMODULATION

This application claims priority from U.S. Provisional Application Ser. No. 60/615,489, filed Oct. 1, 2004, incorporated herein by reference.

STATEMENT REGARDING FEDERALLY SPONSORED RESEARCH OR DEVELOPMENT

This invention was made with Government support awarded by ARL/CTA under Agency Grant No. DAAD19-01-2-0011. The invention was also supported by the NSF under Agency Grant No. EIA-0324864. The Government may have certain rights in this invention.

TECHNICAL FIELD

The invention relates to communication systems and, more particularly, transmitters and receivers for use in wireless communication systems.

BACKGROUND

In general, a receiver in a wireless communication system does not have a priori knowledge of the physical channel over which the transmitted signal propagates or the time at which a transmitter transmits the signal. Timing synchronization, also known as clock recovery, is the process by which the receiver processes a received signal to determine the precise transition points within the received waveform. In other words, the receiver attempts to "synchronize" or align its clock with the clock of the arriving waveform. This process requires the receiver to estimate or otherwise determine the appropriate "timing offset" of the received signal, i.e., the amount of skew between the transmitter's clock and that of the arriving waveform.

Incorrect determination of the timing offset can have detrimental effects on other receiver operations, such as channel estimation, symbol detection, and the like. For example, an incorrect timing offset may cause the received waveform to be sampled at times during which the waveform is in transition between two symbols resulting in an increased number of symbol detection errors.

Ultra-wideband (UWB) systems transmit information via baseband transmissions with high penetration capability and rich multipath diversity. However, the information-bearing waveforms are impulse-like and have low power, which increases the difficulty in achieving accurate and efficient timing synchronization. Timing synchronization algorithms have been developed to mitigate timing offset even in the presence of an unknown multipath channel. However, physical systems often incur residual timing errors, particularly under low complexity constraints.

On the other hand, some modulation schemes bypass channel estimation, such as transmitted reference (TR) and differential schemes. TR schemes correlate each received information-bearing waveform with a pilot waveform whereas differential schemes correlate adjacent information-bearing waveforms. Thus, differential schemes are more bandwidth efficient than TR schemes.

SUMMARY

In general, techniques are described that provide noncoherent demodulation via correlating "dirty" templates in wireless communication systems. For example, the described techniques cross-correlate dirty templates that are adjacent symbol-long segments of the received noisy waveform. Unlike transmitted reference (TR) and differential templates that are noisy, i.e., propagate through the wireless communication channel, these dirty templates are both noisy and offset in time and, thus, are dirty. The described techniques enable noncoherent demodulation without timing synchronization and channel estimation. Symbol demodulation may be performed utilizing a maximum likelihood (ML) sequence detector or, alternatively, conditional ML demodulation may be performed to reduce receiver complexity. The described techniques may also be applied to a TR scheme to improve performance in the presence of mistiming. In any case, the techniques may be applied to narrowband, wideband, or ultra-wideband (UWB) communication systems and remain operational without timing synchronization or channel estimation.

In one embodiment, the invention is directed to a method comprising receiving a waveform through a wireless communication channel, wherein the received waveform comprises a stream of information-bearing symbols, correlating a first template/segment with a second template/segment so as to form a symbol rate sample, wherein the first template and the second template are adjacent symbol-long segments of the received waveform, forming estimates of partial energies of the wireless communication channel; and outputting a stream of symbol estimates in accordance with the symbol rate sample and the channel energy estimates.

In another embodiment, the invention is directed to a wireless receiver comprising an antenna to receive a waveform through a wireless communication channel, wherein the received UWB waveform comprises bursts of information-bearing symbols, a template extraction unit that correlates a first template with a second template so as to form a symbol rate sample, wherein the first template and the second template are adjacent symbol-long segments of the received waveform, a channel energy unit to form estimates of partial energies of the communication channel, and a symbol detector to output a stream of estimate symbols based on the estimate of the channel energy and the symbol-rate sample.

In another embodiment, the invention is directed to a computer-readable medium containing instructions that when executed in a receiver receive a waveform through a wireless communication channel, wherein the received waveform comprises bursts of information-bearing symbols, correlate a first template with a second template so as to form a symbol-rate sample, wherein the first temple and the second template are adjacent symbol-long segments of the received waveform, form estimates of partial energies of the communication channel, and output a stream of symbol estimates in accordance with the estimated channel energy and the symbol rate sample.

The techniques described herein may offer one or more advantages. For example, cross-correlating adjacent symbol-long segments of the received waveform, i.e., adjacent dirty templates enables demodulation without timing synchronization and channel estimation provided instersymbol interference (ISI) is avoided. In particular, the received waveform may be a narrowband, wideband, or UWB waveform and the described techniques operate in the presence of noise, multipath, and time-hopping. Additionally, the dirty templates can be selected to be data aided, i.e., selected to include training symbols, or non-data aided, also referred to as "blind." For example, the described techniques can be applied to data aided schemes, such as TR, and non-data aided schemes, such as differential schemes. When applied to non-data aided schemes, the described techniques generally result in a more efficient use of bandwidth, while the techniques result in higher performance when applied to a data aided scheme.

Other advantages that may be provided by the described techniques include a selectable trade-off between performance and complexity. Selecting optimal maximum likelihood (ML) demodulation increases the performance of the described techniques. For example, performing symbol demodulation with a sequence detector, such as Viterbi's algorithm, increases the performance by demodulating two symbols per integrate-and-dump operation, i.e., per cross-correlation of adjacent dirty templates. However, performing symbol demodulation with a conditional ML symbol detector reduces complexity by demodulating only one symbol per integrate-and-dump operation conditioned on the previous symbol.

The details of one or more embodiments of the invention are set forth in the accompanying drawings and the description below. Other features, objects, and advantages of the invention will be apparent from the description and drawings, and from the claims.

DETAILED DESCRIPTION

Throughout the Detailed Description $\lfloor \bullet \rfloor$ and $\lceil \bullet \rceil$ represent integer floor and ceiling operations and x (mod y):=x−y$\lfloor$x/y$\rfloor$ represents both integer and real-valued modulo operations on x with base y.

Figure 1:
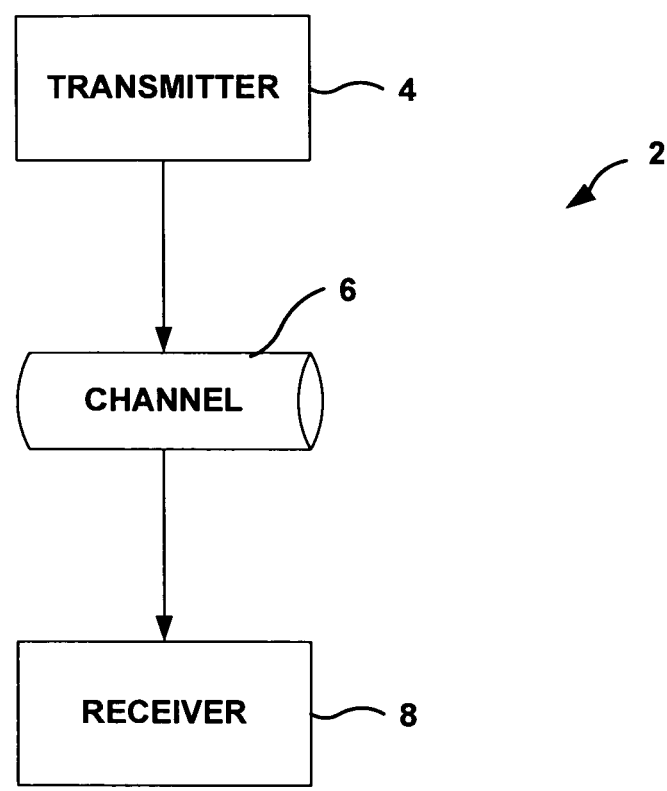
FIG. 1 is a block diagram illustrating a wireless communication system performing noncoherent demodulation with dirty templates.

FIG. 1 is a block diagram illustrating a wireless communication system 2 in which a transmitter 4 communicates with a receiver 8 through a wireless channel 6. The techniques are described in reference to ultra-wideband (UWB), but are also applicable to narrowband and wideband communication systems provided intersymbol interference (ISI) is avoided or minimized. In general, the invention provides techniques for performing noncoherent demodulation with "dirty" templates or, more specifically, adjacent symbol-long segments of a waveform received by receiver 8 which propagates through channel 6. Unlike transmitted reference (TR) templates and differential templates that are noisy, i.e., propagate through the wireless communication channel, these dirty templates are both noisy and offset in time and, thus, are dirty. In the described embodiments, communication system 2 may be subject to noise, multipath, and time-hopping (TH). The techniques can be applied to data aided schemes, such as TR, and non-data aided schemes, such as differential schemes. When applied to non-data aided schemes, the techniques generally result in a more efficient use of bandwidth. In any case, the techniques enable noncoherent demodulation without timing synchronization and channel estimation.

Transmitter 4 transmits data as a UWB waveform using a modulation scheme, such as or pulse amplitude modulation (PAM). Accordingly, each information-bearing symbol is conveyed by $N_f$ data modulated pulses p(t) with duration $T_p$ per frame of duration $T_f > T_p$. Thus, the symbol duration is $T_s = N_f T_f$ seconds. To smooth transmit-spectra, provide low probability of detection (LPD), and accommodate multiple users, pseudo-random TH codes may be employed. TH codes shift the pulse positions from frame to frame at multiples of the chip duration, which is defined as $T_c := T_f / N_c$, with $N_c$ representing the number of chips per frame. Letting $c_k \in [0, N_c-1]$ represent the TH code during the kth frame, the transmitted symbol-long waveform $p_T(t)$ containing $N_f$ pulses is given by equation (1) where $T_c > T_p$.

$$p_T(t) := \sum_{k=0}^{N_f-1} p(t - kT_f - c_k T_c) \qquad (1)$$

Receiver 8 receives the transmitted UWB waveform through channel 6 which may be modeled as a tapped-delay line with L+1 taps $\{\alpha_l\}_{l=0}^L$ and delays $\{\tau_l\}_{l=0}^L$. Channel 6 may also be quasi-static, i.e., the coefficients and delays remain invariant over one transmission burst but are allowed to change across bursts. For notational simplicity, the examples that follow will be described using PAM. Consequently, for a single user link, the waveform arriving at receiver 8 is given according to equation (2) where $\varepsilon$ is the transmit energy per pulse, $\eta(t)$ is the additive white Gaussian noise (AWGN) as well as multi-user interference introduced by channel 6 that, and $\tilde{s}(n) := s(n) \cdot \tilde{s}(n-1)$ are differentially encoded symbols with s(n) representing the original binary PAM symbol.

$$r(t) = \sqrt{\varepsilon} \sum_{n=0}^{+\infty} \tilde{s}(n) \sum_{l=0}^{L} \alpha_l \cdot p_T(t - nT_s - \tau_l) + \eta(t) \qquad (2)$$

To isolate dispersive multipath effects from the propagation delay and clock offset, also referred to as the timing offset $\tau_0$, all path delays are expressed as $\tau_{l,0} := \tau_l - \tau_0$. Thus, the aggregate channel, i.e., channel 6 in combination with the pulse shaper of transmitter 4, is given by equation (3). The aggregate channel is also referred to as the received symbol-level waveform. Using equation (3), the received noisy waveform simplifies to equation (4).

$$p_r(t) := \sum_{l=0}^{L} \alpha_l p_T(t - \tau_{l,0}) \qquad (3)$$

$$r(t) = \sqrt{\varepsilon} \sum_{n=0}^{+\infty} \tilde{s}(n) \cdot p_R(t - nT_s - \tau_0) + \eta(t) \qquad (4)$$

ISI is avoided by selecting $T_f \geq \tau_{L,0} + T_p$ and $c_0 = c_{N_f-1} = 0$ in order to confine the duration of $p_R(t)$ within $[0, T_s)$. Thus, TH is still present in equation (4) and the analysis that follows because only the last frame assumes $c_{N_f-1} = 0$. The noncoherent demodulation techniques employed by receiver 8 remain operational without timing synchronization or channel estimation provided ISI is avoided. However, the condition $T_f \geq \tau_{L,0} + T_p$ can be relaxed to allow for higher data rates, provided that guard frames are inserted between symbols to avoid ISI in similar fashion to zero-padding in narrowband systems. The noncoherent demodulation techniques allow for inter-frame interference (IFI) that is introduced by TH codes and/or large channel delay spread if ISI is absent. Furthermore, as shown herein in the graphs provided in FIGS. 7-12, the noncoherent demodulation techniques exhibit robustness even when low or moderation ISI is present. Consequently, without loss of generality, the timing offset $\tau_0$ is confined within a symbol duration, i.e., $\tau_0 \in [0, T_s)$.

Generally, receiver 8 does not know the time at which transmitter 4 transmits the UWB waveform or the propagation delay, i.e., timing offset, when the waveform r(t) is received. For example, receiver 8 may initiate demodulation techniques when a change in the energy of received waveforms is detected and, thus, has no timing or channel information.

With respect to UWB transmissions, timing synchronization and channel estimation constitute two significant factors preventing the maximum capacity from being achieved. Timing synchronization algorithms have been constructed to provide reasonable performance even in the presence of an unknown multipath channel. However, timing errors are inevitable in real world applications, especially under low complexity constraints and the performance of such algorithms degrades considerably. The performance decrease of such algorithms in the presence of timing offset is shown in the graphs provided in FIGS. 7-12. In addition, data aided and non-data aided modulation schemes bypass channel estimation. For example, data aided schemes, such as TR, correlate each received information-bearing waveform with an accompanying pilot waveform while non-data aided schemes, such as differential schemes, demodulate by correlating adjacent received information-bearing waveforms. However, while optimized versions of TR exist that recover most of the 50% rate loss caused by transmitting pilot or reference waveforms, TR reference schemes generally are not bandwidth efficient. In any case, data aided and non-data aided modulation schemes remain dependent on the timing offset and, thus, experience a decrease in performance in the presence of a timing offset.

As described herein, receiver 8 receives a waveform in accordance with equation (4) and employs noncoherent demodulation techniques to output a stream of symbol estimates. In particular, receiver 8 extracts dirty templates from the received waveform, performs an integrate-and-dump operation with the extracted dirty templates to form a symbol-rate sample, and demodulates the symbol-rate sample to generate an estimate of the received symbol. In other words, receiver 8 cross-correlates adjacent symbol-long segments of the received waveform via integrate-and-dump operations which enable low complexity implementation. In one example, receiver 8 may perform demodulation via an optimal maximum likelihood (ML) demodulator, such as a sequence detector. In another example, receiver 8 may perform demodulation via a lower complexity conditional ML demodulator. In a further example in which wireless communication system employs a robust-to-timing TR (RTTR) scheme, receiver 8 demodulates a received waveform via an adapted ML sequence detector or a conditional ML demodulator. Thus, system 2 provides a selectable trade-off between performance and complexity and remains operational without timing and channel information.

The techniques described herein may be applied to uplink and/or downlink transmissions, i.e., transmissions from a base station to a mobile device and vice versa. Consequently, transmitter 4 and receiver 8 may be any device configured to communicate using a wireless transmission including a distribution station, a hub for a wireless local area network, mobile phone, a laptop or handheld computing device, a personal digital assistant (PDA), a device within a wireless personal area network, a device within a sensor network, or other device. Transmitter 4 and receiver 8 may include executable instructions and one or more processors, such as a general purpose processor or a digital signal processor (DSP), to implement the techniques described herein. The techniques may be implemented in hardware, firmware, software, or combinations thereof.

Figure 2:
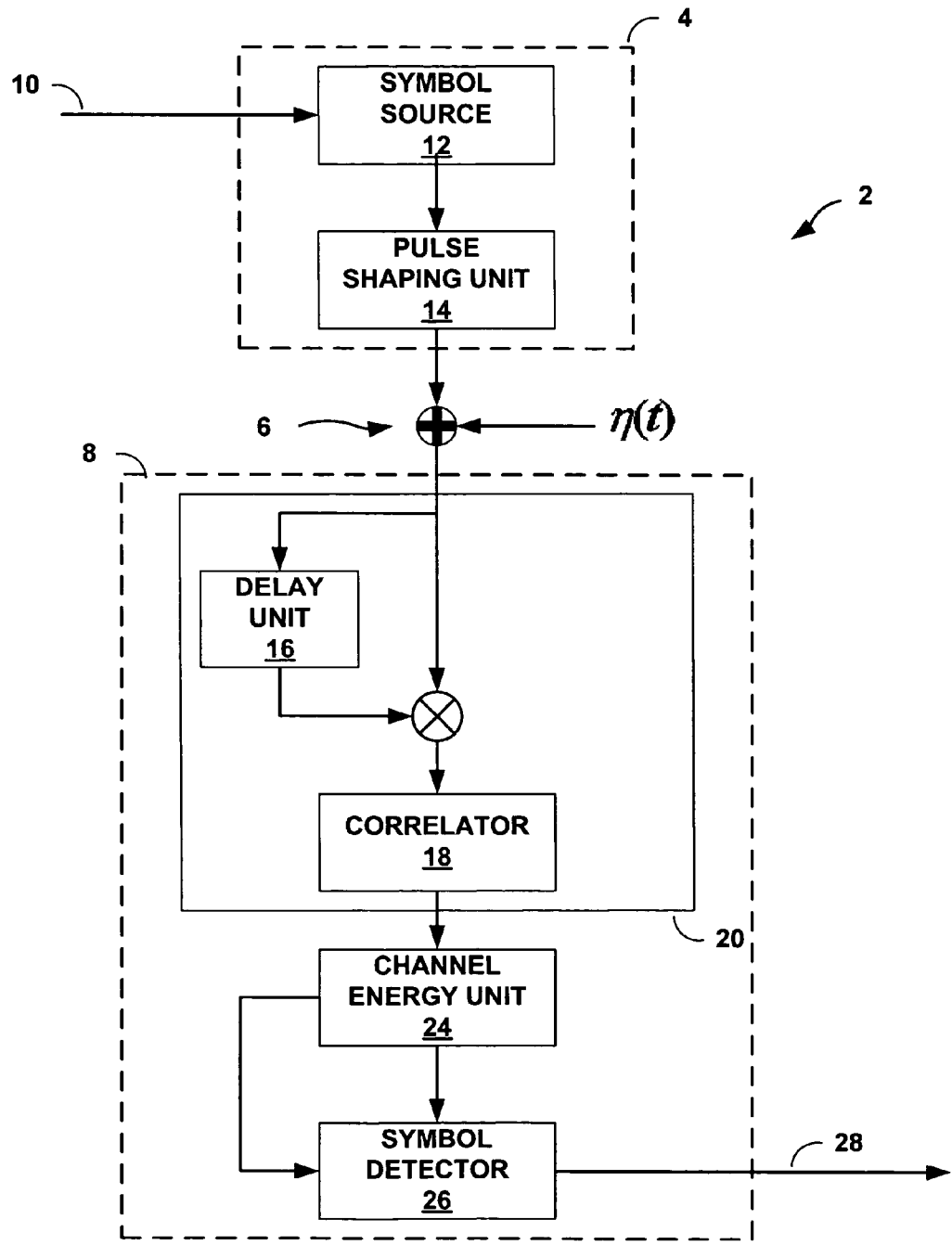
FIG. 2 is a block diagram illustrating an example embodiment of the wireless communication system of FIG. 1.

FIG. 2 is a block diagram illustrating in further detail transmitter 4 and receiver 8 of the exemplary wireless communication system 2 of FIG. 1. In general, pulse generator 12 processes a data stream 10 of information-bearing symbols to generate a burst of symbols. Pulse generator 12 inserts training or pilot symbols into each burst of symbols in embodiments in which wireless communication system 2 employs data aided techniques, such as TR. Pulse shaping unit 14 outputs a stream of short pulses to form a UWB transmission waveform in accordance with the burst of symbols. The transmission waveform is a continuous time waveform carrying the pulse-shaped pulses through channel 6. Channel 6 may provide multiple paths for the transmission waveform with η(t) modeled as AWGN and includes multi-user interference.

The received UWB waveform is given according to equation (4). Receiver 8 does not know when transmitter 4 began transmitting or the propagation delay of channel 6. In operation, template unit 20 turns on when a change in energy is detected in the received waveforms and initiates noncoherent demodulation over an observation interval. An observation interval includes M segments of a received waveform. Each segment has a duration $T_s$ starting at instants $t=mT_s$, $m=0, 1, \ldots, M-1$. Denoted as $r_m(t)$, these symbol-long segments of the received waveform are given according to equation (5). Substituting equation (4) into equation (5) results in equation (6) for $\forall m$ where $\eta_m(t):=\eta(t+mT_s)$, $\forall t\in[0, T_s)$. In the absence of channel induced ISI or partial response signaling, timing offset induces ISI form at most one adjacent symbol. Consequently, equation (6) can be simplified to equation (7).

$$r_m(t) = r(t - mT_s), \; t \in [0, T_s], \; m \in [0, M-1] \tag{5}$$

$$r_m(t) = \sqrt{\varepsilon} \sum_{n=0}^{\infty} \tilde{s}(m-n) p_R(t + nT_s - \tau_0) + \eta_m(t) \tag{6}$$

$$r_m(t) = \sqrt{\varepsilon} \sum_{n=0}^{1} \tilde{s}(m-n) p_R(t + nT_s - \tau_0) + \eta_m(t) \tag{7}$$

The symbol-long segments $r_m(t)$ of the received waveform given in equation (7) are not "clean" because these segments are not only noisy, but also delayed by the unknown propagation delay $\tau_0$ and distorted by unknown multipath channel 6. Thus, these symbol-long segments or "dirty" templates are fundamentally different from templates used in TR and differential schemes where templates are noisy and distorted but must be taken at the correct time instances.

Template unit 20 includes delay unit 16 and correlator 18 for performing integrate-and-dump operations on adjacent dirty templates. Delay unit 16 multiplies the received waveform by delay $T_s$. Correlator 18 receives the output of delay unit 16 and the received waveform as input. Consequently, correlator 18 correlates the product of $r_m(t)$ and $r_{m-1}(t)$ to produce symbol-rate samples in accordance with equation (8). Using equation (8) and the differential encoding $s(m)=\tilde{s}(m)\tilde{s}(m-1)$, the symbol-rate samples of equation (8) can be expressed in accordance with equation (9) where $$\varepsilon_A(\tau_0) := \varepsilon \int_0^{T_s} p_R^2(t + T_s - \tau_0) dt = \varepsilon \int_{T_s-\tau_0}^{T_s} p_R^2(t) dt \text{ and}$$

$$\varepsilon_B(\tau_0) := \varepsilon \int_0^{T_s} p_R^2(t - \tau_0) dt = \varepsilon \int_0^{T_s-\tau_0} p_R^2(t) dt. \text{ The sum}$$

$$\varepsilon_A(\tau_0) + \varepsilon_B(\tau_0) = \varepsilon_R := \varepsilon \int_0^{T_s} p_R^2(t) dt$$

captures the energy of the aggregate channel given in equation (3) and does not depend on the timing offset $\tau_0$.

$$\chi(m) := \int_0^{T_s} r_m(t) r_{m-1}(t) dt \quad (8)$$

$$\chi(m) := \tilde{s}(m-1)\tilde{s}(m-2)\varepsilon_A(\tau_0) + \tilde{s}(m)\tilde{s}(m-1)\varepsilon_B(\tau_0) + \xi(m) \quad (9)$$
$$= s(m-1)\varepsilon_A(\tau_0) + s(m)\varepsilon_B(\tau_0) + \xi(m)$$

If a timing synchronization unit or timing offset estimator was inserted to compensate for the timing offset $\tau_0$ and estimated the timing offset almost perfectly, then $\tau_0 \approx 0$. In this case, $\varepsilon_A(0) \approx 0$, $\varepsilon_B(0) \approx \varepsilon_R$ and equation (9) simplifies to $\chi(m) = s(m)\varepsilon_R + \xi(m)$ which can be demodulated with a slicer. Thus, setting $\tau_0 = 0$ shows that differential UWB systems that requiring timing synchronization but bypass channel estimation, i.e., "semi-coherent" differential UWB systems, can be viewed as special cases of the noncoherent demodulation techniques described herein. However, even when synchronization is performed, timing errors are inevitable in physical systems. Thus, $\varepsilon_A(\tau_0)$ and $\varepsilon_B(\tau_0)$ are both nonzero in physical systems and direct application of semi-coherent different demodulation results in considerable performance degradation. The performance degradation is quantified in simulation results provided in FIGS. 7-12. Thus, noncoherent demodulation employed by receiver 8 may be particularly advantageous since receiver 8 remains operational for an unknown timing offset.

Before deriving the noncoherent demodulation technique employed by receiver 8, we examine the noise term $\xi(m)$ in equation (9). This noise term is the superposition of three terms $\xi_1(m)$, $\xi_2(m)$, and $\xi_3(m)$ given in equations (10-12), respectively.

$$\xi_1(m) = \sqrt{\varepsilon} \sum_{n=0}^1 \tilde{s}(m-n+1) \int_0^{T_s} p_R(t + nT_s - \tau_0) \eta_{m-1}(t) dt \quad (10)$$

$$\xi_2(m) = \sqrt{\varepsilon} \sum_{n=0}^1 \tilde{s}(m-n-1) \int_0^{T_s} p_R(t + nT_s - \tau_0) \eta_m(t) dt \quad (11)$$

$$\xi_3(m) = \int_0^{T_s} \int_0^{T_s} \eta_m(t) \cdot \eta_{m+1}(t) dt \quad (12)$$

Letting $\tilde{s}(m) \in \{\pm 1\}$ while being independent and identically distributed (i.i.d.) and $\eta(t)$ in equation (4) being bandpass filtered AWGN with zero mean and double-sided power spectral density $\sigma^2/2$, reveals that $\xi_1(m), \xi_2(m),$ and $\xi_3(m)$ can be approximated as uncorrelated Gaussian variables with zero mean and variances $\varepsilon_R \sigma^2/2$, $\varepsilon_R \sigma^2/2$, and $\sigma^4 BT_s/4$, respectively, where B is the double-sided bandwidth of front end of receiver 8. As a result, the overall noise $\xi(m)$ in the symbol rate sample x(m) is also well modeled as zero-mean Gaussian with variance $\sigma_\xi^2 := \varepsilon_R \sigma^2 + \sigma^4 BT_s/4$.

Before deriving demodulation operations employed by receiver 8, two remarks are made. The first remark points out that the noncoherent demodulation technique employed by receiver 8 is fundamentally different from TR, pulse waveform amplitude modulation (PWAM), and differential schemes. In particular, the similarity of $\xi(m)$ in equation (9) with TR, PWAM and differential systems is expected because each of these systems employ the same integrate-and-dump operation between segments of a noisy received waveform. However, the noncoherent demodulation techniques derived herein require no timing synchronization whereas TR, PWAM, and differential schemes require timing synchronization. Additionally, correlation in TR and PWAM is performed between pilot and information-bearing waveforms, with the former generating an estimate of the aggregate channel. In contrast, noncoherent demodulation is performed with only information-bearing waveforms and without knowledge of the channel. The absence of pilots in noncoherent demodulation results in no sacrifice in the transmission rate while TR can experience up to a 50% loss in transmission rate.

The second remark points out that timing offsets are unavoidable in physical systems. This will be made clear in the following description and supported with simulations provided in FIGS. 7-12. Moreover, a robust-to-timing TR (RTTR) is also described with respect to wireless communication system 2 in the following description. The RTTR system is developed by adapting the noncoherent demodulation techniques to a TR system and experiences improved performance over TR systems. Furthermore, the noncoherent demodulation techniques are described herein with respect to schemes without timing synchronization in the interest of brevity, and should not be considered limiting of the invention as broadly claimed. However, the noncoherent demodulation techniques may also be employed after timing synchronization to further improve robustness against timing errors. Accordingly, the demodulation techniques need not be limited only to non-data aided UWB systems without timing synchronization, but also may be employed by narrowband or wideband systems utilizing data aided or non-data aided transmissions with or without timing synchronization.

We now describe symbol demodulation based on symbol-rate samples x(m) output by correlator 18. In particular, each symbol-rate sample includes two consecutive symbols, i.e., s(m) and s(m-1). Accordingly, x(m) can be viewed as the symbol-rate sampled output of an unknown first-order ISI channel with impulse response taps given as the partial energies $\varepsilon_A(\tau_0)$ and $\varepsilon_B(\tau_0)$. Consequently, this viewpoint suggests noncoherent algorithms for joint symbol detection and estimation of the unknown equivalent channel based on the output samples give in equation (9). Specifically, only two equivalent channel taps may be estimated by receiver 8 in comparison to the hundreds of taps present in channel 6.

Based on the noise-free part of x(m) in equation (9), ML estimates of $s(m^{-1})$ and s(m) can be formed according to equation (13).

$$\{\hat{s}(m-1), \hat{s}(m)\} = \arg \min_{\{s_1, s_2\}} |\overline{\chi}^{(s_1, s_2)}(m) - \chi(m)| \quad (13)$$

Viterbi's algorithm (VA) can be employed to implement equation (13). However, the VA requires knowledge of $\varepsilon_A(\tau_0)$ and $\varepsilon_B(\tau_0)$ which are unknown because timing and channel information is unknown. Therefore, estimates of $\varepsilon_A(\tau_0)$ and $\varepsilon_B(\tau_0)$ are needed prior to applying equation (13). With binary inputs, the equivalent two-tap channel can only generate four distinct outputs, i.e., all possible combinations of the doublet $\{s(m), s(m+1)\}$. Accordingly, $|\bar{\chi}(m)|$ can only take two values: $\epsilon_R$ and $|\epsilon_A(\tau_0)-\epsilon_B(\tau_0)|$. It is shown in Appendix I of U.S. Provisional Application Ser. No. 60/615,489, filed Oct. 1, 2004, incorporated herein by reference, that $\{|\bar{\chi}(m)|\}$ can be treated as i.i.d. random variables with mean and standard deviation according to equations (14) and (15), respectively. Thus, sample estimators for $\hat{\epsilon}_{max}(\tau_0)$ and $\hat{\epsilon}_{min}(\tau_0)$ can be implemented according to equations (16) and (17).

$$E\{|\bar{\chi}(m)|\} = \varepsilon_{MAX}(\tau_0) := \max\{\varepsilon_A(\tau_0), \varepsilon_B(\tau_0)\} \quad (14)$$

$$STD\{|\bar{\chi}(m)|\} = \varepsilon_{min}(\tau_0) := \min\{\varepsilon_A(\tau_0), \varepsilon_B(\tau_0)\} \quad (15)$$

$$\hat{\varepsilon}_{max}(\tau_0) := \frac{1}{M}\sum_{m=0}^{M-1}|\chi(m)| \quad (16)$$

$$\hat{\varepsilon}_{min}(\tau_0) := \sqrt{\frac{1}{M}\sum_{m=0}^{M-1}(|\chi(m)| - \hat{\varepsilon}_{max}(\tau_0))^2} \quad (17)$$

In order to obtain $\hat{\epsilon}_A(\tau_0)$ and $\hat{\epsilon}_B(\tau_0)$ from $\hat{\epsilon}_{max}(\tau_0)$ and $\hat{\epsilon}_{min}(\tau_0)$, an initial value is needed to determine the relative magnitudes. Accordingly, 1 and $-1$ are selected the first two symbols transmitted by transmitter 4. From equation (9), the initial symbols yield the noise-free sample $\bar{x}(0)=\epsilon_A(\tau_0)-\epsilon_B(\tau_0)$. The sign of $\bar{x}(0)$ reveals which of $\epsilon_A(\tau_0)$ and $\epsilon_B(\tau_0)$ is larger and, therefore, enables $\hat{\epsilon}_{max}(\tau_0)$ and $\hat{\epsilon}_{min}(\tau_0)$ to be assigned to $\epsilon_A(\tau_0)$ and $\epsilon_B(\tau_0)$ according to equations (18) and (19), respectively, where $\delta(\bullet)$ represents Kronecker's delta function.

$$\hat{\varepsilon}_A(\tau_0) = \hat{\varepsilon}_{max}(\tau_0)\delta(\text{sign}\{\chi(0)\} - 1) + \hat{\varepsilon}_{min}(\tau_0)\delta(\text{sign}\{\chi(0)\} + 1) \quad (18)$$

$$\hat{\varepsilon}_A(\tau_0) = \hat{\varepsilon}_{max}(\tau_0)\delta(\text{sign}\{\chi(0)\} + 1) + \hat{\varepsilon}_{min}(\tau_0)\delta(\text{sign}\{\chi(0)\} - 1) \quad (19)$$

Noise may render the sign of $x(0)$ different from that of $\bar{x}(0)$. The probability of this occurring can be shown to be $$Q\left(\frac{|\varepsilon_A(\tau_0) - \varepsilon_B(\tau_0)|}{\sigma_\xi}\right)$$

where $Q(\bullet)$ is the Gaussian tail function. This probability is large when $|\epsilon_A(\tau_0)-\delta_B(\tau_0)|$ is relatively small, in which case the effects of mistakenly alternating to $\epsilon_A(\tau_0)$ and $\epsilon_B(\tau_0)$ is also small. As an extreme example, it does not make a difference to alternate to $\epsilon_A(\tau_0)$ and $\epsilon_B(\tau_0)$ when $\epsilon_A(\tau_0)=\epsilon_B(\tau_0)$. In cases where $|\epsilon_A(\tau_0)-\epsilon_B(\tau_0)|$ is much greater compared with the noise variance, an alternation between to $\epsilon_A(\tau_0)$ and $\epsilon_B(\tau_0)$ can have considerable effect on the demodulation performance. However, the probability of an alternation is small in this case.

Thus, over a burst of duration $MT_s$, template extraction unit 20 performs an integrate-and-dump operation of every pair of adjacent symbol-long segments of the received waveform to obtain $x(m)$, $\forall m \in [0, M-1]$ in accordance with equation (8). Channel energy unit 22 generates $\hat{\epsilon}_{max}(\tau_0)$ and $\hat{\epsilon}_{min}(\tau_0)$ according to equations (16) and (17), and $\epsilon_A(\tau_0)$ and $\epsilon_B(\tau_0)$ according to equations (18) and (19), respectively. Symbol detector 26 forms ML estimates of $s(m-1)$ and $s(m)$ according to equation (13) to produce M symbol estimates 28. Thus, symbol detector 26 may be implemented as a ML sequence estimator. In alternative embodiments, symbol detector 26 may implement per-survivor variants of VA to tradeoff performance for complexity.

Symbol detector 26 may also be implemented as a conditional ML demodulator to reduce complexity. In particular, each symbol $s(m)$ appears in two consecutive symbol rate samples, i.e., $x(m)$ and $x(m+1)$. Thus, each symbol $s(m)$ has two "chances" to be demodulated. Specifically, $s(m)$ can be demodulated based on either $x(m)$ or $x(m+1)$. Consequently, symbol detector 26 can be developed with lower complexity in comparison to the ML sequence detector using a conditional approach.

For example, demodulating $s(m)$ from sample $x(m+1)$ and ignoring $s(m+1)$, which has yet to be demodulated, enables equation (8) to be simplified to a sign detector in accordance with equation (20).

$$\hat{s}(m)=\text{sign}\{\chi(m+1)\} \quad (20)$$

On the other hand, conditioned on the previous estimate $\hat{s}(m-1)$, symbol $s(m)$ can be demodulated from $x(m)$ according to equation (21). Consequently, implementing symbol detector 26 according to equation (21) results in symbol detector 26 being ML optimal conditioned on $s(m-1)$ being correctly demodulated. It can be verified that equation (21) can be simplified to the decision directed form given in equation (22).

$$\hat{s}(m) := \arg\min_{s\in\{\pm1\}} |\hat{s}(m-1)\cdot\hat{\varepsilon}_A(\tau_0) + s\hat{\varepsilon}_B(\tau_0) - x(m)| \quad (21)$$

$$\hat{s}(m) = \text{sign}\{\chi(m-1) - \hat{s}(m-1)\hat{\varepsilon}_A(\tau_0)\} \quad (22)$$

To optimize the demodulation performance of symbol detector 26 at reduced complexity, symbol detector 26 applies the one of equations (20) and (22) which incurs the smaller average probability of error. To determine how to select which of equations (20) and (22) incurs the smaller average probability of error, we consider the constellation of $\bar{x}(m)$ generated by symbol pairs $\{s(m-1), s(m)\}$, i.e., $\{-1, -1\}$, $\{-1, 1\}$, $\{1, -1\}$, and $\{1, -1\}$. Thus, the probability of erroneously demodulating $s(m)$ using equation (20) or the sign detector (SD) is given according to equation (23). The probability of erroneously demodulating $s(m)$ using equation (22) or the decision-directed (DD) rule is given according to equation (24).

$$P_{SD}(\text{error}) = \frac{1}{2}Q\left(\frac{\varepsilon_R}{\sigma_\xi}\right)\frac{1}{2}Q\left(\frac{\varepsilon_A(\tau_0) - \varepsilon_B(\tau_0)}{\sigma_\xi}\right) \quad (23)$$

$$P_{DD}(\text{error} | \hat{s}(m-1)\text{correct}) = Q\left(\frac{\varepsilon_B(\tau_0)}{\sigma_\xi}\right) \quad (24)$$

Equation (23) shows that estimation of $s(m)$ using the SD or the DD rule results in different error rates. For example, it is not favorable to demodulate $s(m)$ from $x(m)$ if $\epsilon_B(\tau_0)$ is small because the distance between the left and right pairs of the of the constellation points, i.e., $\{-1, -1\}$, and $\{1, -1\}$, is also small. However, it is also not desirable to demodulate $s(m)$ from $x(m+1)$ if the difference $|\epsilon_A(\tau_0)-\epsilon_B(\tau_0)|$ is small because the distance between the two center pairs, i.e., $\{-1, 1\}$ and $\{1, -1\}$, is also small.

Thus, to obtain reliable error performance, symbol detector 26 apply one of equations (20) and (22) according to $\min\{P_{SD}$ (error), $P_{DD}(\text{error}|\hat{s}(m-1)\text{correct}))$. From equation (24), it is clear that the selection depends on $\epsilon_A(\tau_0)$, $\epsilon_B(\tau_0)$, and the effective signal-to-noise ratio $$(SNR) \frac{\varepsilon_R}{\sigma_\xi}.$$

Because the estimates of $\epsilon_A(\tau_0)$ and $\epsilon_B(\tau_0)$ can be formed in accordance with equations (18) and (19), respectively, the following description shows that symbol detector 26 can choose between equations (20) and (22) according to the ratio $p_{ba}:=\epsilon_B(\tau_0)/\epsilon_A(\tau_0)$. In other words, symbol detector can choose to apply the SD or the DD rule by determining which of $\epsilon_A(\tau_0)$ and $\epsilon_B(\tau_0)$ is larger.

When $p_{ba}<0$, the two-tap channel is minimum-phase and vice versa. Consequently, it first appears that symbol detector should apply the SD if the channel is minimum-phase and should apply the DD rule if the channel is maximum-phase. However, the optimal $p_{ba}$ turns out to depend on the $$SNR \frac{\varepsilon_R}{\sigma_\xi}$$

as shown. Thus, symbol detector performs conditional ML demodulation according to equations (25) and (26). The proof for equations (25) and (26) is given in appendix II of U.S. Provisional Application Ser. No. 60/615,489, filed Oct. 1, 2004, incorporated herein by reference.

$$P_{SD}(\text{error}) < P_{DD}(\text{error}|\hat{s}(m-1)\text{correct}), \forall p_{ba} \in [0, 0.5] \quad (25)$$

$$P_{SD}(\text{error}) > P_{DD}(\text{error}|\hat{s}(m-1)\text{correct}), \forall p_{ba} \in [1, \infty] \quad (26)$$

Thus, all symbols should be estimated using the SD given in equation (20) if a channel and timing offset $\tau_0$ lead to $p_{ba} \leq 0.5$. On the other hand, if $p_{ba} > 1$, then the DD rule give in equation (22) should be used to estimate all the symbols. Equations (25) and (26) do not specify which of the SD and the DD rule to use when $p_{ba} \in ((0.5, 1)$. However, in the description that follows, high SNR is beneficial for the DD rule because the previous estimate can be used while estimates $\epsilon_A(\tau_0)$ and $\epsilon_B(\tau_0)$ are typically not reliable at low SNR. Thus, symbol detector should apply the SD in equation (20) if $p_{ba} \leq 0.5$ and apply the DD rule in equation (22) otherwise, i.e., if $p_{ba} > 0.5$. In particular, each of the SD and the DD rule can be implemented with a single slicer and have lower complexity than the ML sequence detector given in equation (13).

As a result, with perfect timing, i.e., $\tau_0 = 0$, $\epsilon_A(\tau_0) = 0$, and the conditional ML decision rules given in equations (13), (20), and (22) simplify to a differential UWB demodulator given in equation (27). Thus, the differential UWB demodulator may be implemented as a sign detector.

$$\hat{s}(m) = \text{sign}\{\chi(m)\} \quad (27)$$

Consequently, when symbol detector demodulates s(m), $\forall m \in [2, M-1]$ by applying the SD of equation (20) when $\hat{p}_{ba} = \epsilon_B(\tau_0)/\epsilon_A(\tau_0) \leq 0.5$ and by applying the DD rule of equation (22) when $\hat{p}_{ba} = \epsilon_B(\tau_0)/\epsilon_A(\tau_0) > 0.5$. Otherwise, symbol detector demodulates s(M) by applying the DD rule of equation (22).

Again, although the noncoherent demodulation techniques were developed without timing synchronization, the invention is not limited as such. Rather, the noncoherent demodulation techniques may be applied to data aided or non-data aided systems with timing synchronization. In such cases, the timing offset $\tau_0$ corresponds to residual timing errors that cannot be avoided in physical systems. In the following description, noncoherent demodulation techniques are adapted to a TR system and will be shown to substantially improve the bit-error-rate performance of TR in the presence of unknown timing offset or timing error.

In a conventional TR UWB system, each information-bearing waveform is accompanied by a pilot waveform. At the receiver, the received pilot waveforms are delayed by one frame duration $T_f$ and correlated with the adjacent information-bearing waveform. The total of $N_f/2$ correlation outputs corresponding to a single symbol are then accumulated to form symbol-rate samples. The symbol-rate samples serve as decision statistics used to estimates of the received symbols.

When perfect timing is achieved, the delayed pilot waveforms are perfectly aligned with the information-bearing waveforms. The symbol rate corresponding to the mth symbol is given according to equation (27) where the energy of each received frame-level waveform is $$\frac{\varepsilon_R}{N_f}$$

in the absence of TH. Because integration is performed over $N_f/2$ frames, the variance of the noise term $\xi(m)$ is $\sigma_\xi^2/2$. Based on the symbol-rate samples in equation (28), the original TR demodulator is a sign detector give by equation (29).

$$\chi(m) = \frac{\varepsilon_R}{2}s(m) + \xi(m) \quad (28)$$

$$\hat{s}(m) = \text{sign}\{\chi(m)\} \quad (29)$$

In any case, the symbol-rate samples x(m) will hve a form different from that of equation (28) when timing offset of residual errors≠0. In the following description, the performance of a TR UWB system with respect to unknown timing offset or timing error is examined.

If $\lfloor \tau_0/T_f \rfloor$ is an even number, the integration window boundaries fall into information-bearing waveforms and x(m) is given according to equation (30) where $$\varepsilon_B(T_s - \tau_f) = \varepsilon \int_0^{\tau_f} p_R^2(t)\, dt$$

by definition, $$N_\tau := \lfloor \tau_0/(2T_f) \rfloor,$$

and $$\tau_f := T_f - \tau_0 (\text{mod } T_f) \text{ can}$$

can be interpreted as the symbol-level and frame-level timing offset, respectively.

$$\chi(m) = \left[\frac{N_\tau}{N_f}\varepsilon_R - \varepsilon_B(T_s - \tau_f)\right]s(m-1) + \qquad (30)$$

$$\left[\left(\frac{1}{2} - \frac{N_\tau}{N_f}\right)\varepsilon_R + \varepsilon_B(T_s - \tau_f)\right]s(m) + \xi(m),$$

If $\lfloor \tau_0/T_f \rfloor$ is an odd number, the integration window boundaries fall into pilot waveforms and symbol-rate samples are given according to equation (31). Combining equations (30) and (31), the general form of symbol-rate samples in a TR-UWB system with timing offset $\tau_0$ is given according to equation (32) where $$\tilde{\varepsilon}_A(\tau_0) := \begin{cases} \frac{N_\tau}{N_f}\varepsilon_R - \varepsilon_B(T_s - \tau_f), & \text{if } \lfloor \tau_0/T_f \rfloor \text{ is even} \\ \frac{N_\tau}{N_f}\varepsilon_R, & \text{if } \lfloor \tau_0/T_f \rfloor \text{ is odd} \end{cases} \text{ and }$$

$$\tilde{\varepsilon}_B(\tau_0) := \begin{cases} \left(\frac{1}{2} - \frac{N_\tau}{N_f}\right)\varepsilon_R + \varepsilon_B(T_s - \tau_f), & \text{if } \lfloor \tau_0/T_f \rfloor \text{ is even} \\ \left(\frac{1}{2} - \frac{N_\tau}{N_f}\right)\varepsilon_R, & \text{if } \lfloor \tau_0/T_f \rfloor \text{ is odd} \end{cases}$$

$$\chi(m) = \frac{N_\tau}{N_f}\varepsilon_R \cdot s(m-1) + \left(\frac{1}{2} - \frac{N_\tau}{N_f}\right)\varepsilon_R \cdot s(m) + \xi(m) \qquad (31)$$

$$\chi(m) = \tilde{\varepsilon}_A(\tau_0) \cdot s(m-1) + \tilde{\varepsilon}_B(\tau_0) \cdot s(m) + \xi(m) \qquad (32)$$

Thus, when $\lfloor \tau_0/T_f \rfloor$ is odd, symbol-rate samples are insensitive to the frame-level offset $\tau_f$. In particular, when $\tau_0 \epsilon \lfloor T_s - T_f, T_s \rfloor$, $N_\tau = N_f/2$ and $\tau_f \epsilon \lfloor 0, T_f \rfloor$. In addition, equation (31) yields $\chi(m) = (\varepsilon_R/2) \cdot s(m-1) + \xi(m)$ which is essentially the same as equation (28). Therefore, TR-UWB relaxes timing requirements to some extent. However, the TR demodulator given in equation (29) will experience performance degradation in the presence of timing offset. This is supported in the simulations provided in FIGS. 7-12.

As a result, employing the noncoherent demodulation techniques to a TR system results in a RTTR system with improved performance over a TR system in the presence of unknown timing offset or timing error $\tau_0$. Moreover, in the presence of unknown timing offset, equation (32) which models input/output (I/O) relationship of a TR-UWB system has the same form as equation (9) which models the I/O relationship of a UWB system with noncoherent demodulation.

Accordingly, the transmitter in a RTTR-UWB system is identical to a transmitter in a TR-UWB system, i.e., each symbol is transmitted over $N_f$ waveforms, out of which $N_f/2$ pilot waveforms and $N_f/2$ information-bearing waveforms are interleaved. However, at the receiver, timing synchronization is performed before performing the following steps.

First $N_f/2$ pairs of frame-long segments of the received waveform are correlated to obtain x(m) according to equation (32), $\forall m \epsilon [0, M-1]$ over each symbol duration $[mT_s, (m+1)T_s)$. Next, estimates of partial energies of the channel, $\hat{\epsilon}_A(\tau_0)$ and $\hat{\epsilon}_B(\tau_0)$, are formed according to equations (16) and (17). The symbol-rate samples are then demodulated using a ML sequence detector or per-survivor processing. Alternatively, the symbol-rate samples may be demodulated with lower complexity but with reduced performance using conditional ML demodulation. In this case, s(m) is demodulated in accordance with equation (20) if $\hat{p}_{ba} \leq 0.5$, $\forall m \epsilon [2, M1]$ or in accordance with equation (22) when $\hat{p}_{ba} > 0.5$, $\forall m \epsilon [2, M]$. s(M) is demodulated according to equation (22). Consequently, a RTTR-UWB system and a TR-WUB system correlate the received waveform in the same manner. However, a TR-UWB system utilizes a SD as given in equation (29) instead of estimating partial energies of the channel and performing ML demodulation or conditional ML demodulation.

Figure 3:
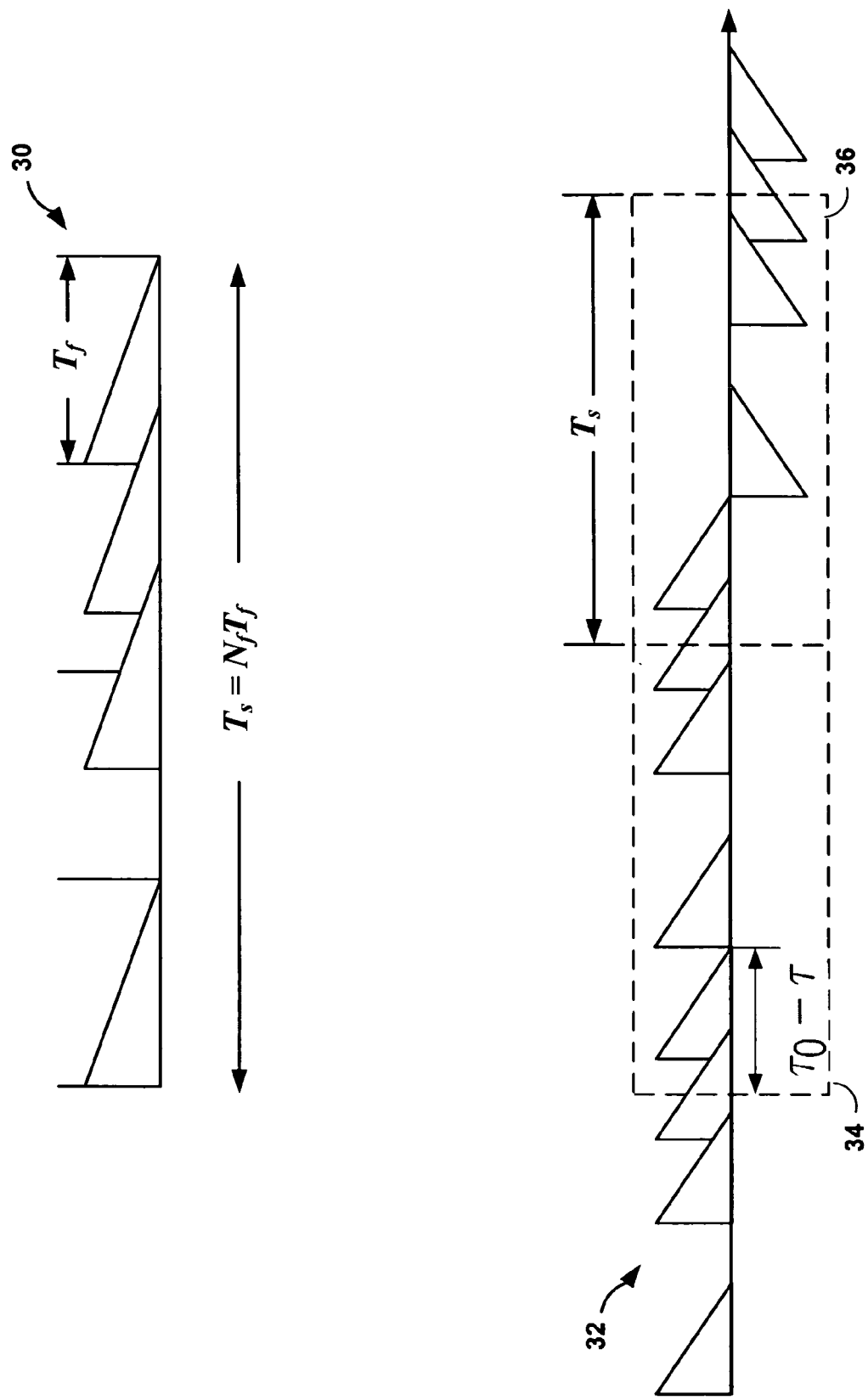
FIG. 3 illustrates an example ultra-wideband (UWB) symbol-long waveform propagated through an aggregate channel and an example UWB waveform with a plurality of symbols for noncoherent demodulation with dirty templates.

FIG. 3 illustrates an example UWB symbol-level waveform 30 and a received waveform 32 observed by receiver of wireless communication system 2. Equation (3) expresses symbol-level waveform 30 in terms of the aggregate channel which includes multipath effects from pulse shaping unit 14 and channel 6. Received waveform 32 may be given in accordance with equation (4) and includes three UWB symbols with received pulses represented as triangles to indicate the time spreading multipath effects of channel 6.

In operation, receiver 8 receives waveform 32 and initiates noncoherent UWB demodulation at a timing offset $\tau_0$-$\tau$. Accordingly, receiver 8 correlates dirty templates 34 and 36 to form symbol-rate samples according to equation (8). Receiver 8 then estimates the partial energies $\hat{\epsilon}_A(\tau_0)$ and $\hat{\epsilon}_B(\tau_0)$ according to equations (16-19). Specifically, the expected value and standard deviation of the symbol-rate samples are found over an observation interval according to equations (16) and (17) and substituted into equations (18) and (19) to obtain $\hat{\epsilon}_A(\tau_0)$ and $\hat{\epsilon}_B(\tau_0)$, respectively. ML demodulation is then performed on the symbol-rate sample according to equation (13) to form estimates of the received symbols in a given symbol-long segment of waveform 32.

Figure 4:
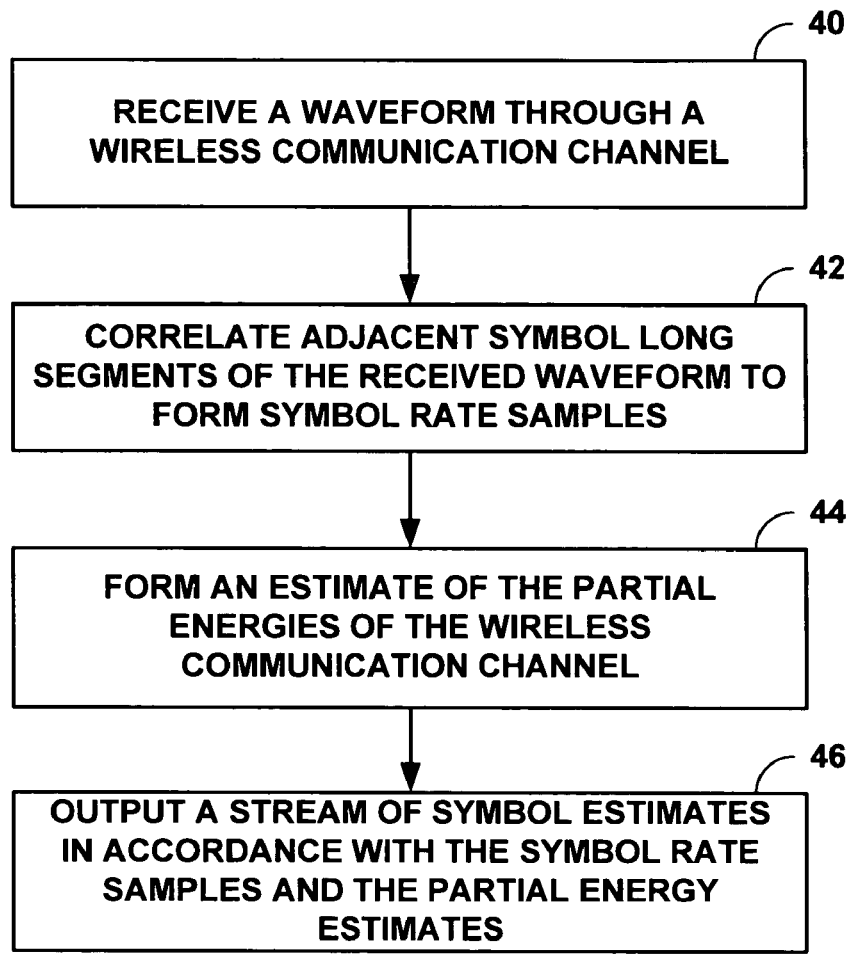
FIG. 4 is a flowchart illustrating exemplary operation of a communication system in which optimal maximum likelihood (ML) noncoherent demodulation is performed with dirty templates for non-data aided transmissions.

FIG. 4 is a flowchart illustrating exemplary operation of receiver 8 using noncoherent ML demodulation with dirty templates. Initially, receiver 8 turns on or receives a waveform through channel 6 (step 40) when a change in the energy of the received waveforms is detected. For each observation interval of M symbol-long segments, receiver 8 correlates adjacent symbol-long segments of the received waveform to form symbol rate samples (step 42) in accordance with equation (8). When the adjacent symbol-long segments or dirty templates have been correlated over M successive segments, receiver 8 forms an estimate of the partial energies of channel 6 (step 44) for each of the symbols within a symbol rate sample in accordance with equations (16-19). Receiver 8 outputs a stream of symbol estimates based in accordance with the symbol rate samples and the estimates of the partial energies of channel 6 (step 46). For example, receiver 8 may be implemented as a sequence detector in accordance with equation (13).

Figure 5:
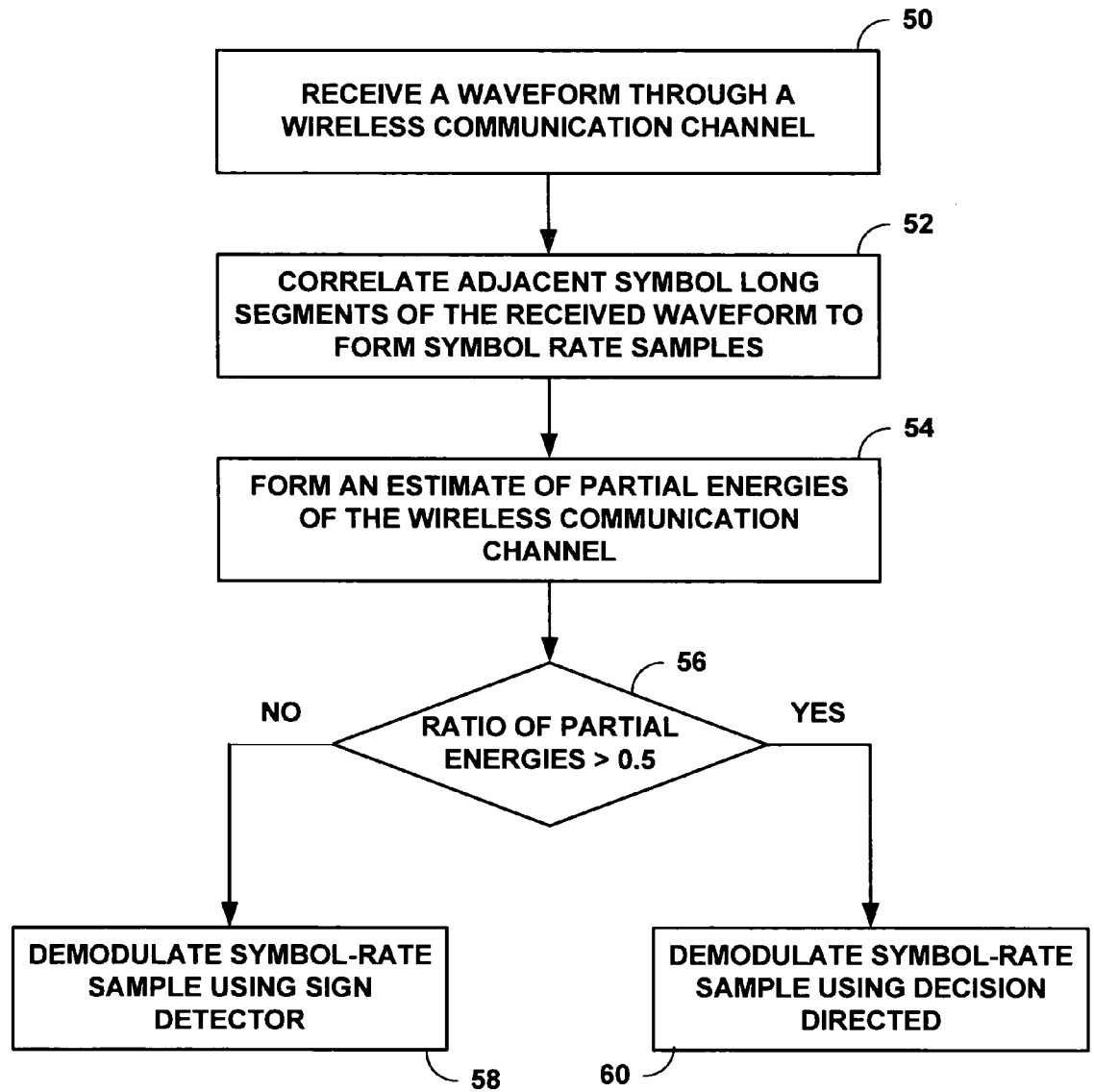
FIG. 5 is a flowchart illustrating an exemplary operation of a communication system in which conditional ML noncoherent demodulation is performed with dirty templates for non-data aided transmissions.

FIG. 5 is a flowchart illustrating an exemplary operation of receiver 8 using noncoherent conditional ML demodulation with dirty templates. Because conditional ML demodulation generates only one symbol estimate for each symbol rate-sample, receiver 8 may be implemented with lower complexity.

In general, noncoherent conditional ML demodulation and noncoherent ML demodulation correlate dirty templates in the same manner but apply different demodulation techniques. Accordingly, receiver 8 turns on or receives a waveform through channel 6 (step 50) when a change in the energy of the received waveforms is detected. Receiver 8 correlates adjacent symbol-long segments of the received waveform to form symbol rate samples (step 52) in accordance with equation (8). Next, receiver 8 forms an estimate of the partial energies of channel 6 (step 54) for each of the symbols from a symbol rate sample in accordance with equations (16-19) and determines the ratio between the partial energies (step 56). When this ratio $\hat{p}_{ba} \leq 0.5$, $\forall m \epsilon [2, M-1]$, receiver 8 demodulates the symbol-rate sample according to equation

(22) (step 60). When this ratio $\hat{p}_{b_a} > 0.5$, $\forall m \in [2, M]$ and for s(M), receiver 8 demodulates the symbol-rate sample according to equation (20) (step 58).

Figure 6:
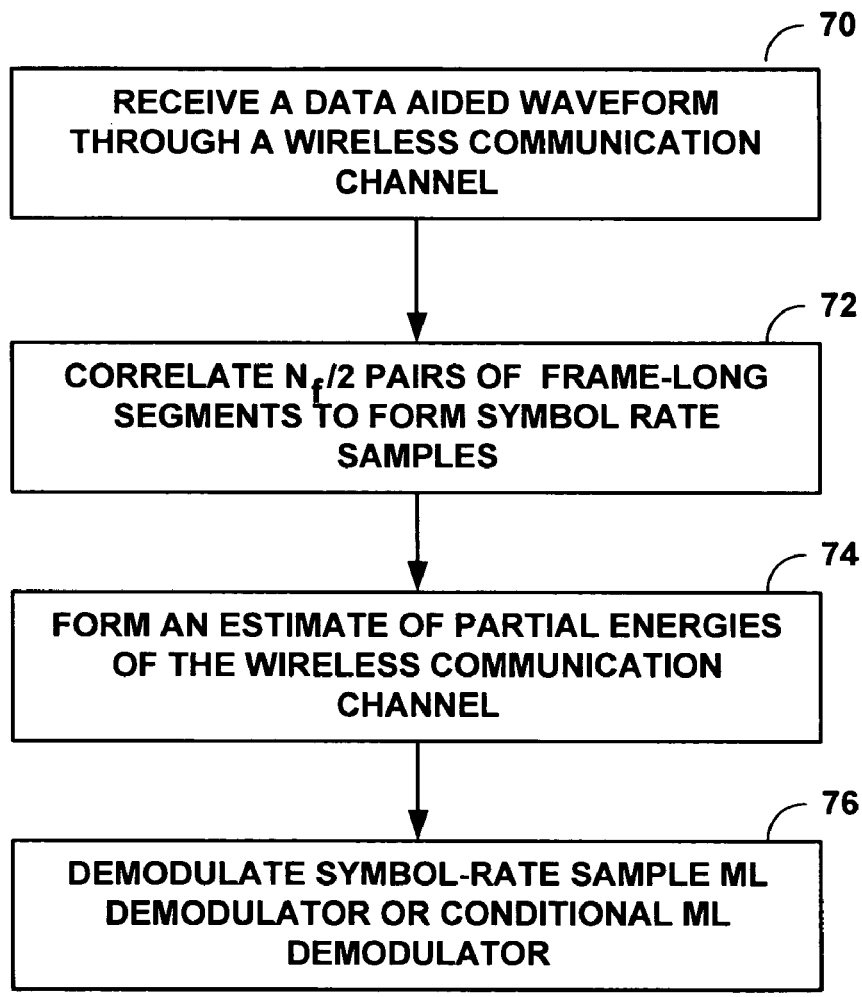
FIG. 6 is a flowchart illustrating an exemplary operation of a communication system in which noncoherent demodulation is performed with dirty templates for transmitted reference (TR) transmissions.

FIG. 6 is a flowchart illustrating exemplary operation of receiver 8 for non-coherent demodulation with dirty templates in a RTTR system. In the RTTR system, each symbol is transmitted over $N_f$ waveforms, out of which $N_f/2$ pilot waveforms and $N_f/2$ waveforms information-bearing waveforms are interleaved. Thus, receiver 8 receives a data aided waveform through channel 6 step (70). Over each symbol duration $[mT_s, (m+1)T_s]$, receiver 8 correlates $N_f/2$ pairs of frame-long segments to form symbol-rate samples (step 72). Next, receiver 8 forms estimates of the partial energies of channel 6 (step 74) in accordance with equations (16-19). Receiver 8 may demodulate the symbol rate sample (step 76) based on the estimates of the partial energies in accordance with the ML sequence detector or, may trade-off performance for complexity and demodulate the symbol rate sample in accordance with the previously described conditional ML demodulation techniques.

FIGS. 7-12 are graphs that present simulations of the described noncoherent demodulation techniques and comparisons with TR and differential (DIFF) UWB. The TR and DIFF UWB systems are characterized as "semi-coherent" because these systems bypass channel estimation but require timing information.

Coherent symbol demodulation is also possible with a Rake receiver which has often been tested under assumptions of perfect timing, perfect channel delay, and perfect tap estimation. However, when timing and/or channel estimates are imperfect, the performance of coherent demodulators can be affected considerably. For example, even under the assumptions of perfect synchronization and perfect estimation of channel tap delays, TR can outperform Rake receivers in some circumstances. Moreover, performance of the Rake receiver is expected to further degrade when timing and channel tap delay estimation errors are not negligible. Thus, the described noncoherent demodulation techniques are compared only with TR and DIFF UWB receivers.

In all simulations, a Gaussian monocycle with duration $T_p=0.1$ nanoseconds (ns) is used for the pulse shaper p(t) and the number of frames per symbol is selected as $N_f=32$. In particular, a first frame duration is selected with $T_f=35$ ns to avoid ISI and a second frame duration is selected with $T_f=5$ ns to allow ISI involving two consecutive symbols The multipath channels are generated using the channel model described in J. R. Foerster, *Channel Modeling Sub-committee Report Final*, IEEE P802.15-02/368r5-SG3a, IEEE P802.15 Working Group for WPAN, November 2002, which is incorporated herein by reference, with channel taps and parameters $(1/\Lambda, 1/\lambda, \Gamma, \gamma)=(43, 0.4, 7.1, 4.3)$ ns. The TH codes are generated independently from a uniform distribution over $[0, N_c-1]$ with $N_c=35$ and $T_c=1$ ns. Timing offsets $\tau_0$ are uniformly distributed over $[0, T_s]$. When timing synchronization is also performed, the "dirty" template based acquisition algorithm described in L. Yang and G. B. Giannakis, "Low-complexity training for rapid timing acquisition in Ultra-Wideband communications," in *Proc. Of Global Telecommunications Conf.*, San Francisco, Calif., Dec. 1-5, 2003, pp. 769-773, hereby incorporated by reference, is used with four training symbols. Two of the training symbols can also be used for estimating $\epsilon_A(\tau_0)$ and $\epsilon_B(\tau_0)$.

Figure 7:
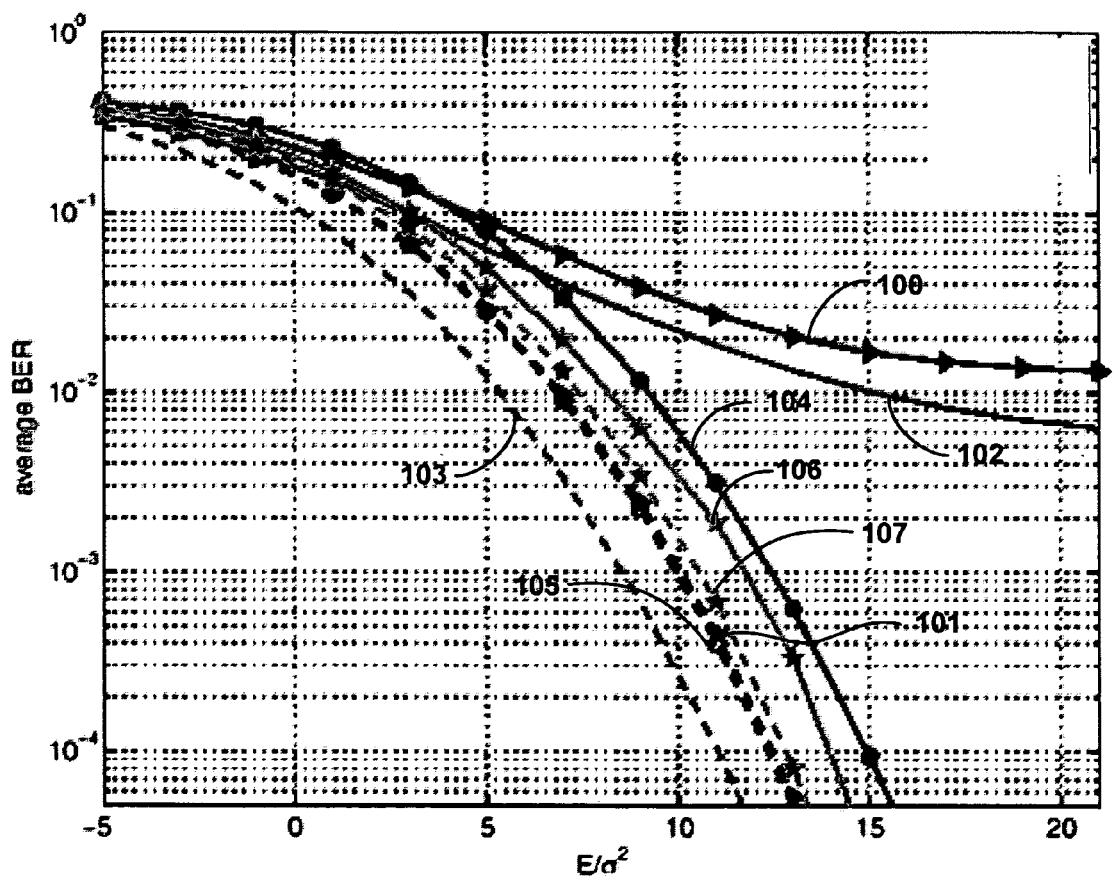
FIGS. 7-12 are graphs illustrating results of simulations and comparisons that validate analyses and designs of noncoherent demodulation with dirty templates.

FIG. 7 is a graph illustrating a comparison of BER performance in the presence and absence of timing offset for TR UWB, DIFF UWB, and ML and conditional ML demodulation employed in the described noncoherent demodulation techniques. Specifically, plots 100-107 correspond to TR-UWB, DIFF UWB, noncoherent ML demodulation or Viterbi's algorithm (VA) demodulation, and noncoherent conditional ML (CML) demodulation in the presence and absence of timing offset, respectively. Plots with sold lines represent BER performance in the presence of timing offset and the plots with dashed lines represent BER performance in the absence of timing offset.

In particular, if it is known at the receiver that perfect timing has been achieved, the CML demodulator simplifies to equation (27). As shown by plots 103 and 101, the simulated BER for DIFF UWB is approximately 1 dB better than that of TR UWB because the latter suffers from energy loss caused by the insertion of training symbols. Moreover, DIFF UWB also outperforms both VA and CML based noncoherent demodulations. When timing is perfect, i.e., $\tau_0=0$, decisions should be made using $\epsilon_B(0)$ alone since $\epsilon_A(0)=0$. DIFF UWB makes decisions in the manner, whereas VA and CML demodulators always assume imperfect timing and attempt to form partial energy estimates $\hat{\epsilon}_A(\tau_0)$ and $\hat{\epsilon}_B(\tau_0)$ which introduce BER performance degradation. In addition, CML demodulations outperform VA demodulations in this case because CML demodulations discards small $\hat{\epsilon}_A(0)$.

However, in the presence of timing offset, i.e., when timing synchronization is imperfect, both DIFF UWB and TR UWB exhibit considerable performance degradation as shown in plots 102 and 100, respectively. In contrast, the performance degradation for the low complexity CML noncoherent demodulator is approximately 2.5 dB between plots 104 and 105. Moreover, the VA noncoherent demodulator experiences approximately a 1 dB BER performance improvement in the absence of timing offset.

Figure 8:
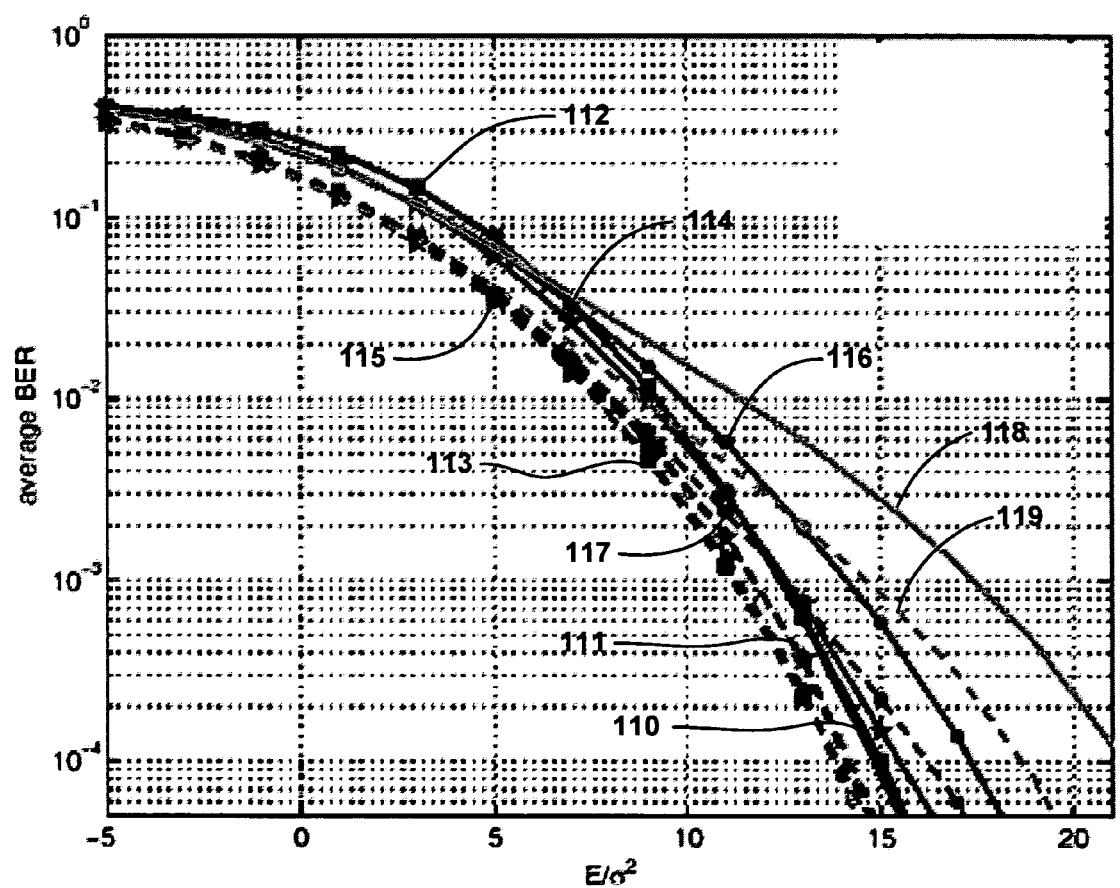

FIG. 8 is a graph illustrating a comparison of BER performance for a CML demodulator with varying threshold values. In particular, plots 110, 112, 114, 116, and 118 correspond to threshold values 0.4, 0.5, 0.7, 0.8, and 0.9, respectively. As shown, plot 112 outperforms plots 110, 114, 116, and 118 for most SNR values. To further test the performance of employing a CML demodulator, FIG. 8 also plots the BER lower bounds for each of the threshold values. These lower bounds are calculated according to equation (24) assuming error-free demodulation of preceding symbols and perfect $\hat{\epsilon}_A(\tau_0)$ and $\hat{\epsilon}_B(0)$ estimates. The lower bounds correspond to plots 111, 113, 115, 117, and 119. As shown, plot 113 outperforms plots 11, 115, 117, and 119. In addition, plots 111, 113, 115, 117, and 119 are lower bounded by plot 120 which corresponds to selecting the minimum of the two probabilities given in equation (24). As shown, plot 120 and plot 119 have similar performance thereby confirming 0.5 as the correct threshold for selecting between equation (20) and (22).

Figure 9:
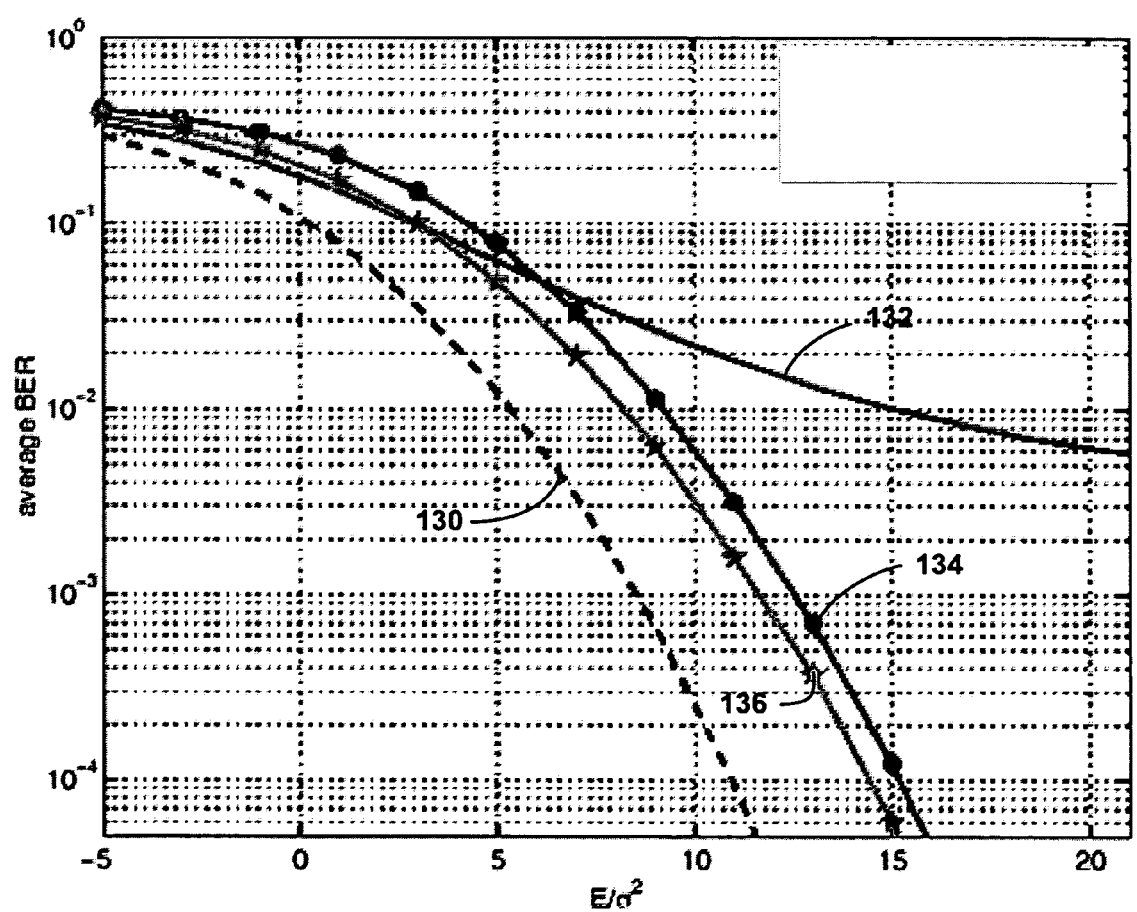

FIG. 9 is a graph illustrating a comparison of BER performance of noncoherent UWB demodulation and DIFF UWB in the presence of TH and timing offset. Specifically, DIFF UWB, UWB with CML demodulation, and UWB with VA demodulation in the presence of TH and timing offset correspond to plots 132, 134, and 136, respectively. DIFF UWB with TH and without timing offset corresponds to plot 130. As shown, plots 130, 132, 134, and 136 experience similar BER performance as plots 102, 104, and 106, respectively. Consequently, TH does not cause a significant degradation of BER performance.

Figure 10:
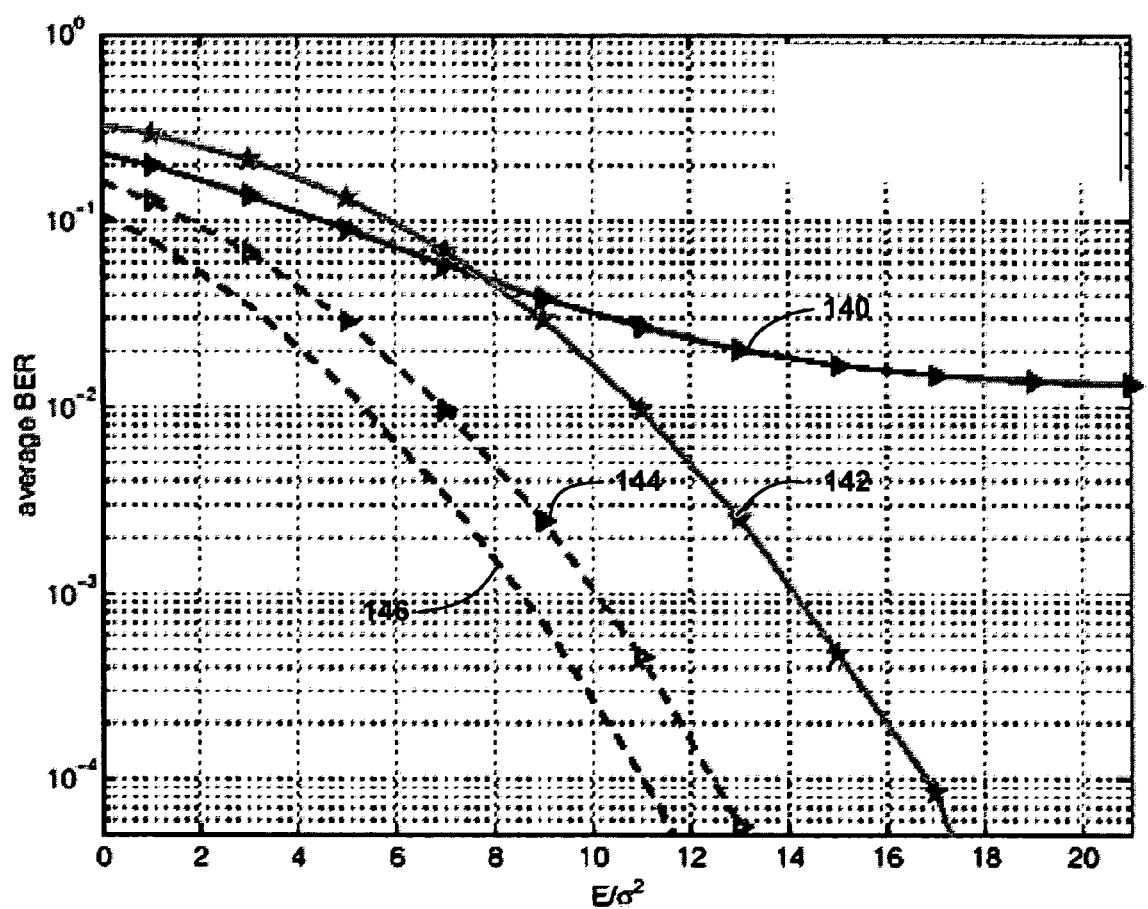

FIG. 10 is a graph illustrating a comparison of BER performance for RTTR UWB and TR UWB in the presence of timing offset. Specifically, plot 140 illustrates the BER performance of TR UWB in the presence of timing offset. Consequently, TR UWB incurs severe BER performance degradation when residual timing errors are present. However, the BER performance of RTTR performance in the presence of timing offset experiences considerable improvement at medium-to-high SNR values as shown by plot 142. The BER performance in the absence of timing offset for DIFF UWB and TR UWB is also shown by plots 146 and 144, respectively. While plot 140 flattens at average BER $10^{-2}$, plot 142 has approximately the same slope as plots 144 and 146. In addition, RTTR UWB is also more bandwidth efficient than DIFF UWB and TR UWB.

Figure 11:
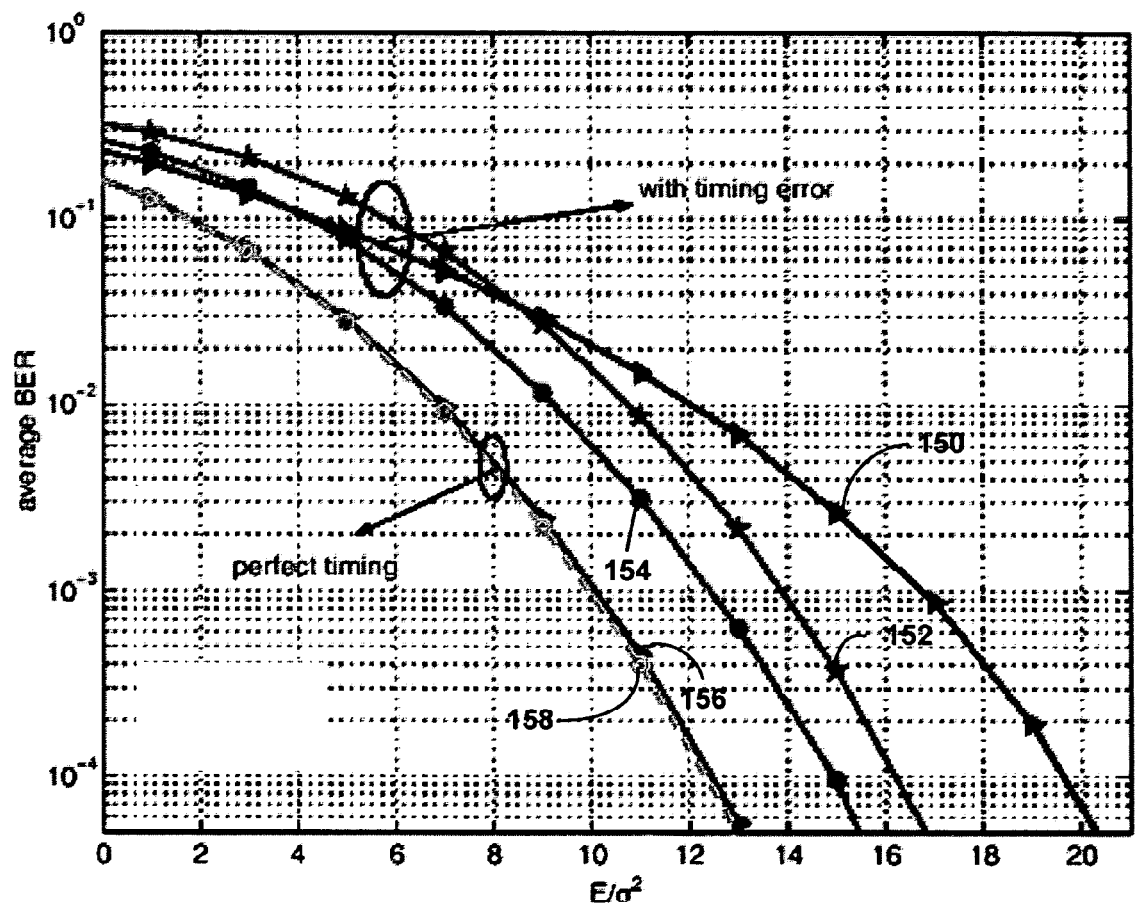

FIG. 11 is a graph illustrating a comparison of BER performance for TR UWB, RTTR UWB, and UWB with noncoherent demodulation in the presence of timing errors due to imperfect timing synchronization. In particular, plots 150, 152, and 154 illustrate the BER performance of TR UWB, RTTR UWB, and UWB with CML demodulation, respectively, in the presence of timing errors. As previously described, RTTR UWB can amend the effects of residual timing errors. This is shown by the considerable BER degradation that TR UWB experiences as shown by plots 152 and 150. However, plot 150 exhibits considerable improvement in BER performance in comparison to plot 140. Thus, BER performance of TR UWB is heavily dependent on timing synchronization. The BER performance of RTTR UWB is approximately 1 dB worse than the BER performance of UWB with CML demodulation in the presence of timing error because of the 50% energy loss caused by the insertion of pilot waveforms.

Figure 12:
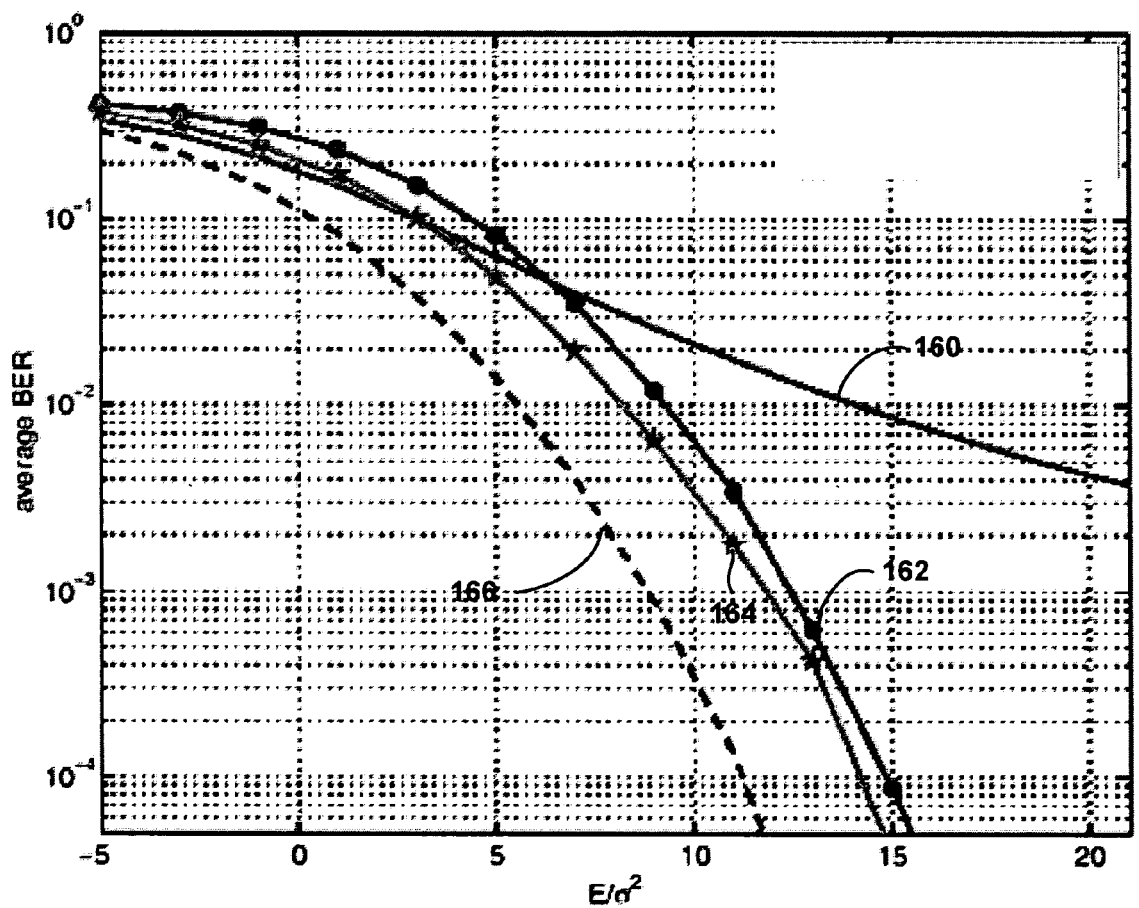

FIG. 12 is a graph illustrating a comparison of BER performance for DIFF UWB, UWB with CML demodulation, and UWB with VA demodulation in the presence of TH, ISI, and timing offset. In particular, the simulations plotted in FIG. 12 were performed with $T_f$=5 ns in order to cause ISI on top of IFI. The BER performance for this scenario is illustrated by plots 160, 162, and 164 for DIFF UWB, UWB with CML demodulation, and UWB with VA demodulation, respectively. When comparing plots 160, 162, and 164 with plots 132, 134, and 136, respectively, that illustrate BER performance in the presence of only TH and timing offset, a significant decrease in BER performance is not observed. The BER performance of a DIFF UWB system in the presence of TH and ISI but without timing offset is shown in plot 166.

Various embodiments of the invention have been described. These and other embodiments are within the scope of the following claims.

The invention claimed is:

1. A method comprising:
receiving a waveform through a wireless communication channel, wherein the received waveform comprises a stream of information-bearing symbols;
correlating symbol-long segments of the received waveform to form a plurality of symbol rate samples, wherein correlating the symbol-long segments comprises, for each of the symbol rate samples, correlating a first template with a second template to form the respective symbol rate sample, and wherein the first template and the second template are adjacent symbol-long segments of the received waveform;
forming, with a receiver device, estimates of partial energies of the wireless communication channel based on the symbol rate samples, wherein the partial energies of the wireless communication channel are dependent upon a timing offset and independent of the information-bearing symbols, and wherein forming the estimates of partial energies of the wireless communication channel comprises forming the estimates of the partial energies without knowledge of the timing offset;
estimating the information-bearing symbols of the received waveform based on the estimates of the partial energies to produce a stream of symbol estimates; and
outputting the stream of symbol estimates.

2. The method of claim 1, wherein correlating the first template with the second template comprises correlating the first template with the adjacent second template according to the following equation:

$$x(m) := \int_0^{T_s} r_m(t) r_{m+1}(t) \, dt,$$

where $T_s$ comprises one symbol duration and $r_m(t)$ represents an mth symbol-long segment of the received waveform for $m \in [0, M-1]$.

3. The method of claim 1, wherein each the symbol rate sample comprises two successive symbols of the received waveform when a timing offset is not equal to zero.

4. The method of claim 3, wherein forming estimates of partial energies of the channel comprises forming estimates for each of the symbols according to the following equations:

$$\hat{\epsilon}_A(\tau_0) = \hat{\epsilon}_{max}(\tau_0) \delta(\text{sign}\{x(0)\}-1) + \hat{\epsilon}_{min}(\tau_0) \delta(\text{sign}\{x(0)\}+1), \text{ and}$$

$$\hat{\epsilon}_B(\tau_0) = \hat{\epsilon}_{max}(\tau_0) \delta(\text{sign}\{x(0)\}+1) + \hat{\epsilon}_{min}(\tau_0) \delta(\text{sign}\{x(0)\}-1),$$

where $$\hat{\epsilon}_{max}(\tau_0) := \frac{1}{M} \sum_{m=0}^{M-1} |x(m)|, \quad \hat{\epsilon}_{min}(\tau_0) := \sqrt{\frac{1}{M} \sum_{m=0}^{M-1} (|x(m)| - \hat{\epsilon}_{max}(\tau_0))^2},$$

$\tau_0$ comprises the unknown timing offset, and x(m) comprises the symbol rate samples for $m \in [0, M-1]$.

5. The method of claim 4, wherein the energy of the communication channel comprises a summation of the channel energy for the symbols, $\epsilon_R = \epsilon_A(\tau_0) + \epsilon_B(\tau_0)$.

6. The method of claim 4, further comprising estimating the symbols of the received waveform substantially according to the following equation:

$$\{\hat{s}(m), \hat{s}(m+1)\} = \arg\min_{\{s_1, s_2\}} |\bar{x}^{(s_1, s_2)}(m) - x(m)|,$$

where $\bar{x}^{(s_1,s_2)}(m) := s_1 \epsilon_A(\tau_0) + s_2 \epsilon_B(\tau_0)$, $x(m) := s(m)\epsilon_A(\tau_0) + s(m+1)\epsilon_B(\tau_0) + \xi_m$, and $\xi_m$ comprises noise.

7. The method of claim 6, further comprising estimating the symbol with the lowest average probability of error determined according to $\rho_{ba} := \epsilon_B(\tau_0)/\epsilon_A(\tau_0)$.

8. The method of claim 7, further comprising estimating the symbol substantially according to $\hat{s}(m) = \text{sign}\{x(m)\}$ when $\rho_{ba} \leq 0.5$.

9. The method of claim 7, further comprising estimating the symbol substantially according to $\hat{s}(m+1) = \text{sign}\{x(m) - \hat{s}(m)\epsilon_A(\tau 0)\}$ when $\rho_{ba} > 0.5$.

10. The method of claim 1, wherein estimating the information-bearing symbols comprises estimating the information-bearing symbols of the received waveform with a maximum likelihood (ML) noncoherent demodulator.

11. The method of claim 10, wherein the ML noncoherent demodulator comprises a sequence detector.

12. The method of claim 11, wherein the sequence detector employs Viterbi's Algorithm.

13. The method of claim 1, wherein estimating the information-bearing symbols comprises estimating the information-bearing symbols of the received waveform with a conditional maximum likelihood (ML) demodulator.

14. The method of claim 13, wherein the conditional ML demodulator comprises a sign detector.

15. The method of claim 1, wherein the stream of information-bearing symbols includes at least one training symbol.

16. The method of claim 15, wherein the at least one training symbols comprises a pair of training symbols.

17. The method of claim 16, wherein the at least one training symbol comprises a positive one and a negative one.

18. The method of claim 1, wherein the received waveform comprises one of a narrowband waveform, a wideband waveform, and an ultra-wideband waveform.

19. The method of claim 1, wherein the received waveform comprises information-bearing symbols interleaved and pilot symbols interleaved with each other.

20. The method of claim 1, wherein the received waveform includes encoded information-bearing symbols.

21. The method of claim 1, wherein the received waveform includes differentially encoded information-bearing symbols.

22. The method of claim 1, wherein forming the estimates of partial energies comprises:

forming a first partial energy estimate based on the symbol rate samples; and forming a second partial energy estimate based on the symbol rate samples and the first partial energy estimate.

23. The method of claim 22, wherein forming the first partial energy estimate comprises:

averaging absolute values of the symbol rate samples to form the first partial energy estimate.

24. The method of claim 1, wherein the wireless communication channel is modeled according to a tapped-delay line model, wherein the partial energies of the wireless communication channel are dependent upon channel taps and channel delays associated with the tapped-delay line model, and wherein forming the estimates of partial energies of the wireless communication channel comprises forming the estimates of the partial energies without knowledge of the channel taps, and the channel delays.

25. A wireless receiver comprising:

an antenna to receive a waveform through a wireless communication channel, wherein the received waveform comprises bursts of information-bearing symbols;

a template extraction unit that correlates symbol-long segments of the received waveform to form a plurality of symbol rate samples, wherein, for each of the symbol rate samples, the template extraction unit correlates a first template with a second template to form the respective symbol rate sample, and wherein the first template and the second template are adjacent symbol-long segments of the received waveform;

a channel energy unit to form estimates of partial energies of the communication channel based on the symbol rate samples, wherein the partial energies of the wireless communication channel are dependent upon a timing offset and independent of the information-bearing symbols, and wherein the channel energy unit forms the estimates of the partial energies without knowledge of the timing offset; and a symbol detector to estimate the information-bearing symbols of the received waveform based on the estimates of the partial energies, and to output a stream of estimated symbols.

26. The receiver of claim 25, wherein the template extraction unit correlates the first template with the adjacent second template according to the following equation:

$$x(m) := \int_0^{T_s} r_m(t) r_{m+1}(t) dt,$$

where $T_s$ comprises one symbol duration and $r_m(t)$ represents an mth symbol-long segment of the received waveform for $m \in [0, M-1]$.

27. The receiver of claim 26, wherein each correlation output $x(m)$ comprises two successive symbols of the received waveform when a timing offset is not equal to zero.

28. The receiver of claim 27, wherein the channel energy unit forms estimates of partial energies for each of the symbols substantially according to the following equations:

$$\hat{\epsilon}_A(\tau_0) = \hat{\epsilon}_{max}(\tau_0)\delta(\text{sign}\{x(0)\}-1) + \hat{\epsilon}_{min}(\tau_0)\delta(\text{sign}\{x(0)\}+1); \text{ and}$$

$$\hat{\epsilon}_B(\tau_0) = \hat{\epsilon}_{max}(\tau_0)\delta(\text{sign}\{x(0)\}+1) + \hat{\epsilon}_{min}(\tau_0)\delta(\text{sign}\{x(0)\}-1),$$

where $$\hat{\epsilon}_{max}(\tau_0) := \frac{1}{M}\sum_{m=0}^{M-1}|x(m)|, \quad \hat{\epsilon}_{min}(\tau_0) := \sqrt{\frac{1}{M}\sum_{m=0}^{M-1}(|x(m)|-\hat{\epsilon}_{max}(\tau_0))^2},$$

$\tau_0$ comprises the unknown timing offset, and $m \in [0, M-1]$.

29. The receiver of claim 28, wherein the energy of the communication channel comprises a summation of the channel energy for the symbols, $\epsilon_R = \epsilon_A(\tau_0) + \epsilon_B(\tau_0)$.

30. The receiver of claim 29, wherein the symbol detector estimates symbols of the received waveform substantially according to the following equation:

$$\{\hat{s}(m), \hat{s}(m+1)\} = \arg\min_{\{s_1, s_2\}} |\bar{x}^{(s_1, s_2)}(m) - x(m)|,$$

where $\bar{x}^{(s_1, s_2)}(m) := s_1\epsilon_A(\tau_0) + s_2\epsilon_B(\tau_0)$, $x(m) := s(m)\epsilon_A(\tau_0) + s(m+1)\epsilon_B(\tau_0) + \xi_m$, and $\xi_m$ comprises noise.

31. The receiver of claim 30, wherein the symbol detector estimates the symbol with the lowest average probability of error determined according to $\rho_{ba} := \epsilon_B(\tau_0)/\epsilon_A(\tau_0)$.

32. The receiver of claim 31, wherein the symbol detector estimates the symbol substantially according to $\hat{s}(m) = \text{sign}\{x(m)\}$ when $\rho_{ba} \leq 0.5$.

33. The receiver of claim 31, wherein the symbol detector estimates the symbol substantially according to $\hat{s}(m+1) = \text{sign}\{x(m) - \hat{s}(m)\hat{\epsilon}_A(\tau 0)\}$ when $\rho_{ba} > 0.5$.

34. The receiver of claim 25, wherein the symbol detector estimates the symbols of the received waveform with a maximum likelihood (ML) noncoherent demodulator.

35. The receiver of claim 34, wherein the ML noncoherent demodulator comprises a sequence detector.

36. The receiver of claim 35, wherein the sequence detector employs Viterbi's Algorithm.

37. The receiver of claim 25, wherein the symbol detector estimates the symbols of the received waveform with a conditional maximum likelihood (ML) demodulator.

38. The receiver of claim 37, wherein the conditional ML demodulator comprises a sign detector.

39. The receiver of claim 25, wherein the receiver comprises a mobile device or a base station.

40. The receiver of claim 25, wherein the received waveform includes at least one training symbol.

41. The receiver of claim 25, further comprising a timing synchronization unit to form a timing offset based on the received waveform, wherein the received waveform includes information-bearing symbols and training symbols interleaved with each other.

42. The receiver of claim 41, wherein the template extraction unit correlates an information-bearing symbol with an adjacent training symbol so as to form a symbol-rate sample.

43. The receiver of claim 25, wherein the received waveform comprises one of a narrowband waveform, a wideband waveform, and an ultra-wideband waveform.

44. A computer-readable storage medium comprising instructions that when executed by a processor cause a receiver to:
   receive a waveform through a wireless communication channel, wherein the received waveform comprises bursts of information-bearing symbols;
   correlate symbol-long segments of the received waveform to form a plurality of symbol rate samples, wherein the instructions that cause the receiver to correlate the symbol-long segments comprise instructions that cause the receiver to, for each of the symbol rate samples, correlate a first template with a second template to form the respective symbol-rate sample, and wherein the first temple and the second template are adjacent symbol-long segments of the received waveform;
   form estimates of partial energies of the communication channel based on the symbol rate samples, wherein the partial energies of the wireless communication channel are dependent upon a timing offset and independent of the information-bearing symbols, and wherein the instructions that cause the receiver to form the estimates of partial energies of the wireless communication channel comprise instructions that cause the receiver to form the estimates of the partial energies without knowledge of the timing offset;
   estimate the information-bearing symbols of the received waveform based on the estimates of the partial energies to produce a stream of symbol estimates; and
   output the stream of symbol estimates.

45. The computer-readable storage medium of claim 44, wherein the instructions when executed cause the receiver to correlate the first template with the adjacent second template according to the following equation:

$$x(m) := \int_0^{T_s} r_m(t) r_{m+1}(t)\, dt,$$

where $T_s$ comprises one symbol duration and $r_m(t)$ represents an mth symbol-long segment of the received waveform for $m \in [0, M-1]$.

46. The computer-readable storage medium of claim 45, wherein each correlation output x(m) comprises two successive symbols of the received waveform when a timing offset is not equal to zero.

47. The computer-readable storage medium of claim 46, further comprising instructions that when executed cause the receiver to form estimates for each of the symbols substantially according to the following equations:

$$\hat{\epsilon}_A(\tau_0) = \hat{\epsilon}_{max}(\tau_0)\delta(\text{sign}\{x(0)\}-1) + \hat{\epsilon}_{min}(\tau_0)\delta(\text{sign}\{x(0)\}+1), \text{ and}$$

$$\hat{\epsilon}_B(\tau_0) = \hat{\epsilon}_{max}(\tau_0)\delta(\text{sign}\{x(0)\}+1) + \hat{\epsilon}_{min}(\tau_0)\delta(\text{sign}\{x(0)\}-1),$$

where $$\hat{\varepsilon}_{max}(\tau_0) := \frac{1}{M}\sum_{m=0}^{M-1} |x(m)|, \quad \hat{\varepsilon}_{min}(\tau_0) := \sqrt{\frac{1}{M}\sum_{m=0}^{M-1} (|x(m)| - \hat{\varepsilon}_{max}(\tau_0))^2},$$

$\tau_0$ comprises a timing offset, and $m \in [0, M-1]$.

48. The computer-readable storage medium of claim 47, further comprising instructions that when executed cause the receiver to estimate symbols of the received waveform substantially according to the following equation:

$$\{\hat{s}(m), \hat{s}(m+1)\} = \arg\min_{\{s_1, s_2\}} |\bar{x}^{(s_1, s_2)}(m) - x(m)|,$$

where $\bar{x}^{(s_1,s_2)}(m) := s_1 \epsilon_A(\tau_0) + s_2 \epsilon_B(\tau_0)$, $x(m) := s(m)\epsilon_A(\tau_0) + s(m+1)\epsilon_B(\tau_0 + \xi_m$, and $\xi_m$ comprises noise.

49. The computer-readable storage medium of claim 48, further comprising instructions that when executed cause the receiver to estimate the symbol with the lowest average probability of error determined according to $\rho_{ba} := \epsilon_B(\tau_0)/\epsilon_A(\tau_0)$.

50. The computer-readable storage medium of claim 49, further comprising instructions that when executed cause the receiver to estimate the symbol substantially according to $\hat{s}(m) = \text{sign}\{x(m)\}$ when $\rho_{ba} \leq 0.5$.

51. The computer-readable storage medium of claim 49, further comprising instructions that when executed cause the receiver to estimate the symbol substantially according to $\hat{s}(m+1) = \text{sign}\{x(m) - \hat{s}(m)\hat{\epsilon}_A(\tau 0)\}$ when $\rho_{ba} > 0.5$.

52. The computer-readable storage medium of claim 44, wherein the instructions when executed cause the receiver to estimate the symbols of the received waveform with a maximum likelihood (ML) noncoherent demodulator.

53. The computer-readable storage medium of claim 44, wherein the instructions when executed cause the receiver to estimate the symbols of the received waveform with a conditional maximum likelihood (ML) demodulator.

54. The computer-readable storage medium of claim 44, further comprising instructions that when executed cause the receiver to estimate a timing offset based on the received waveform.

* * * * *

UNITED STATES PATENT AND TRADEMARK OFFICE
CERTIFICATE OF CORRECTION

| | | |
|---|---|---|
| PATENT NO. | : 7,769,115 B2 | Page 1 of 1 |
| APPLICATION NO. | : 11/242623 | |
| DATED | : August 3, 2010 | |
| INVENTOR(S) | : Georgios B. Giannakis et al. | |

It is certified that error appears in the above-identified patent and that said Letters Patent is hereby corrected as shown below:

In the Specification

Column 1, line 15: "may have certain rights" should be changed to --has certain rights--.

Signed and Sealed this
Fifth Day of May, 2015

Michelle K. Lee
*Director of the United States Patent and Trademark Office*